United States Patent [19]
Hansen

[11] Patent Number: 5,940,475
[45] Date of Patent: *Aug. 17, 1999

[54] TELEPHONE SYSTEM INTEGRATED TEXT BASED COMMUNICATION APPARATUS AND SYSTEM TO ENHANCE ACCESS FOR TDD AND/OR TTY DEVICES

[75] Inventor: Frederick W. Hansen, Murphy, Tex.

[73] Assignee: Northern Telecom Limited, Montreal, Canada

[*] Notice: This patent is subject to a terminal disclaimer.

[21] Appl. No.: 08/865,699

[22] Filed: May 30, 1997

[51] Int. Cl.[6] .................................................. H04M 11/00
[52] U.S. Cl. ......................... 379/52; 379/67.1; 379/90.01
[58] Field of Search .................................. 379/52, 67, 89, 379/93.15, 93.17, 93.24, 100.08, 100.13; 358/402

[56] References Cited

U.S. PATENT DOCUMENTS

| | | | |
|---|---|---|---|
| 4,996,704 | 2/1991 | Brunson | 379/100.08 |
| 5,138,653 | 8/1992 | Le Clercq | 379/96 |
| 5,163,081 | 11/1992 | Wycherley et al. | 379/52 |
| 5,224,156 | 6/1993 | Fuller et al. | 379/100 |
| 5,339,391 | 8/1994 | Wroblewski et al. | 395/157 |
| 5,349,636 | 9/1994 | Irribarren | 379/89 |
| 5,351,189 | 9/1994 | Doi et al. | 364/419 |
| 5,351,288 | 9/1994 | Engelke et al. | 379/98 |
| 5,450,470 | 9/1995 | Alheim | 379/52 |
| 5,463,665 | 10/1995 | Millios et al. | 379/52 |
| 5,559,857 | 9/1996 | Dowens | 379/52 |
| 5,574,776 | 11/1996 | Leuca et al. | 379/113 |
| 5,612,872 | 3/1997 | Fujita | 395/752 |
| 5,701,497 | 12/1997 | Yamauchi et al. | 395/753 |
| 5,717,742 | 2/1998 | Hyde-Thomson | 379/93.24 |
| 5,805,587 | 9/1998 | Norris et al. | 370/352 |

FOREIGN PATENT DOCUMENTS

| | | | |
|---|---|---|---|
| 0 455 912 A2 | 11/1991 | European Pat. Off. | H04M 3/50 |
| 0 845 895 A2 | 6/1998 | European Pat. Off. | H04M 3/50 |

*Primary Examiner*—Curtis A. Kuntz
*Assistant Examiner*—Melvur Ramakrishnaiah
*Attorney, Agent, or Firm*—R. Darryl Burke; McKool Smith

[57] ABSTRACT

An integrated text based TTY system comprises a telephone network, a private branch exchange, a voice mail system, and a text server. The telephone network is adapted to receive a TTY call from a calling party from a TTY device, which is external to said integrated text based TTY system, to a called party. A private branch exchange is in communication with the telephone network and adapted to receive the TTY call from the telephone network. A voice mail system is in communication with the private branch exchange. A text server is in communication with the private branch exchange to receive the TTY call. The text server is also in communication with the voice mail system. The text server receives identification information to identify the called party, so that the text server can check a database of individuals able to receive the TTY call to determine whether the called party is in the database and if the called party is in the database then the text server signals the called party that the TTY call from the calling party has been made. The private branch exchange is also in communication with the text server via a modem and a first communication path extending from the private branch exchange to the modem and the modem is in communication with the text server to receive the TTY call which is routed to the text server by the private branch exchange. The modem recognizes the TTY call as conforming to TTY standards and, if necessary, converts the TTY call into ASCII. The modem also receives a response to the TTY call and converts the response to the TTY call into an appropriate format that conforms to the TTY standards to create a converted response to the TTY call, and transmits the converted response to the TTY call.

25 Claims, 26 Drawing Sheets

TELEPHONE SYSTEM INTEGRATED TEXT BASED COMMUNICATION APPARATUS AND SYSTEM TO ENHANCE ACCESS FOR TDD AND/OR TTY DEVICES

CROSS-REFERENCE TO RELATED APPLICATIONS

The following patent applications, which are filed herewith, are incorporated by reference:

| Reference Number/ Serial Number | Title | Author |
| --- | --- | --- |
| 3870-2000/RR-128.1 | Telephone System Integrated Text Based Communication Processes To Enhance Access for TDD and/or TTY Devices | F. Hansen |
| 3870-2004/RR-129.1 /RR-130.1 /RR-132.1 /RR-133.1 | Telephone System Integrated Text Based Communication Processes to Establish Communication Links to TDD and/or TTY Devices and Other Telephone and Text Server Systems | F. Hansen D. Jennings |
| 3870-2005/RR-129.2 /RR-130.2 /RR-132.2 /RR-133.2 | Telephone System Integrated Text Based Communication Processes to Establish Communication Links to TDD and/or TTY Devices and Other Telephone and Text Server Systems | F. Hansen D. Jennings |
| 3870-2006/RR-131 | Telephone Apparatus, Systems, And Processes to Enhance Access for TDD and/or TTY Devices | F. Hansen |
| 3870-2007/RR-134 | TTY Telephonic Display and Related Processes, Systems and Apparatus | F. Hansen R. Bonner |

FIELD OF INVENTION

The present invention generally relates to the field of communications equipment and processes for the deaf and, more specifically, to the field of TDD and/or TTY devices used by the deaf to communicate.

BACKGROUND

There is an immediate need to provide enhanced text capabilities for the deaf, hearing impaired, and/or speech impaired communities. This is consistent with an overriding social goal of integrating handicapped individuals into traditional society, which is, in part, perhaps, best illustrated by the two recent statutes passed by the United States Congress and signed by the President of the United States: the Americans with Disabilities Act ("ADA") and the Telecommunications Act of 1996. Among other things, these statutes compel manufactures and telecommunications service providers to enhance existing approaches used by members of the deaf, hearing impaired, and/or speech impaired communities to access and utilize telecommunications networks and systems. For instance, the ADA generally requires that handicapped persons have equal access to public (and, in some cases, private) facilities. Among other things, 47 U.S.C. § 225 (b)(1) states that the Federal Communications Commission "shall ensure that interstate and intrastate telecommunications relay services are available, to the extent possible and in the most efficient manner, to hearing-impaired and speech-impaired individuals in the United States." Consequently, over the past several years, it has become imperative for telecommunications companies to develop systems, processes, and apparatus that enable members of the deaf, hearing impaired, and/or speech impaired communities to use telecommunications networks and systems.

Deaf, hearing impaired, and/or speech impaired individuals primarily communicate with others via a Telecommunication Device for the Deaf ("TDD"), which is primarily a teletypewriter ("TTY"). One current problem for users of TTY devices is that the number of people who can be called is limited, because TTY users can only have conversations with others who have a TTY device, have access to a TTY device, and know how to use a TTY device. Many business do not have any TTY device or, if they do have a TTY device, there are a limited number available. Alternatively, TTY-to-speech relay services are sometimes used by deaf, hearing impaired and/or speech impaired people to communicate with hearing/speaking persons. These services are generally provided by a group of people, who basically read the TTY text and vocalize the message to the hearing person and also hear the message from the hearing person and type the TTY text to the deaf, hearing impaired, and/or speech impaired person. A major disadvantage of relay services is that they require a third party for each and every telephone conversation, which is especially problematic for the TTY user in personal or financial matters. Moreover, relay readers employed by relay services can also make mistakes, in part, due to the lack of immediate feedback.

One problem with designing new systems, processes, and apparatus is that TDD and TTY devices are, by today's standards, quite slow. Specifically, in the age of 33.4K (baud modems, Digital Simultaneous Voice and Data ("DSVD"), and 64 Kbits per channel BRI/PRI, a TTY uses the Baudot format consisting of 5-bit words transmitted at a rate as slow as 45.45 bits per second, which is a TDD standard. These signals do not have any carrier and only support 38 characters. Numbers and punctuation characters are generally sent after a shift character is sent to change the character mode to a number mode, so as an example, the number "3" and the letter "E" are both represented by the same code (00001). The difference is dependent on the mode each TDD device is in. If the mode of the TDD devices used in a conversation do not match, the result is garbled words. This problem is exacerbated with the fact that the standards are not likely to change for a variety of reasons. In particular, the existing standards are reliable in that the slow speed will work on almost any quality of a telephone line. In fact, TDD devices routinely use an acoustic coupler to connect to the public network. It can be easily read, as it is received, which is important, because most TTY devices are equipped with a small digit window that shows only one line of text. In addition, existing equipment implementing the standard are relatively inexpensive at about $225.00/device.

Existing designs and procedures have other problems as well.

SUMMARY

Preferred embodiments pertain to an apparatus and related methods and systems that enhance communication systems and processes used by the deaf, hearing-impaired, and/or speech impaired community. Note that preferred methods are preferably performed by the preferred apparatus and systems and are discussed in reference to the preferred apparatus and systems.

Preferred systems are generally comprised of a TTY device, a telephone network, a private branch exchange ("PBX") module, a text server, a voice mail system, at least one telephone, at least one terminal device, and, in some cases, a computer network. Communication paths are used to selectively couple the above elements together, as needed to execute or implement the particular application or feature. The TDD device is typically external to the overall system and is used to generate or initiate the TDD call into the telephone network. The TDD call is preferably received by a port adapted to receive the TDD call. The port is preferably in communication with the PBX module. The PBX module is in communication with a text server via a modem. The text server is directly or indirectly in communication with a voice mail system and with the PBX module. The text server may be in communication with the voice mail system via a voice card and PBX module or directly with certain voice mail systems (e.g., Meridian Mail™) with specialized software (e.g., Meridian Mail ACCESS™). The PBX module is in communication with at least one telephone. The text server is in communication with at least one terminal device (e.g., personal computer) via a local area network ("LAN"), the Internet, or some other form of a network. Note that depending upon the specific feature and/or application of the preferred embodiment, not all of the disclosed elements may need to be required and, as discussed below, the interconnections may change.

Preferred processes use a bulletin board system which presents a number of options (e.g., (i) leave a message; (ii) transfer to a persons telephone number; and/or (iii) log on to a specific mailbox) to direct a TDD call through the voice mail system, computer network, telephone system, PBX, and text server. At each stage, a first party (a calling party) is generally prompted to provide needed information to identify a second party (the called party) or instructions to instruct the preferred system what to do (e.g., leave a message). Identification information includes, but is not limited, to the second party's first name, the second party's employee number, the second party's social security number, the second party's computer address, the second party's mailbox number, the second party's login name, the second party's last name, the second party's full name, the second party's individual telephone number, and the Internet protocol ("IP") address. Preferred systems use this information to direct the TDD call and to determine whether the second party has access to equipment needed to respond to the TDD call. Depending upon the instructions provided by the first and second parties, voice messages are left in voice mail, chat discussions are set-up, e-mail messages are sent, and voice mail boxes are set up, etc. The integration of the components discussed above allows for messages or signals to be sent to and from the voice mail system, the computer system, and the text server.

Preferred embodiments integrate TDD and TTY calls into mainstream telephone system and computer communication functions. Software (and, if needed, hardware) used to implement these features preferably exist on a text server that is unique and separate from the telephone system and/or it will be integral with the telephone system. In particular, the server is preferably comprised of a computer acting as the server, at least one modem that interfaces between the TDD/TTY device and the server, a LAN-WAN-Internet interface, a data interface to the voice processing system, and a data interface to the telephone system. Preferred embodiments combine modem based TDD/TTY translation (TDD or TTY to ASCII and ASCII to TDD or TTY), Bulletin Board, chat, telephone system and LAN systems to allow TDD or TTY callers to communicate with telephone system users via chat connections between the TDD/TTY and the users desktop computer via the TDD modem and a LAN connection. Callers will be able to route their own calls by responding to automated TDD prompts stored in the software. The storage media for both the prompts and the messages will be ASCII or similar text format.

The preferred embodiments have a number of other unique features, which along with other advantages, will be discussed below in reference to the preferred embodiments.

BRIEF DESCRIPTION OF THE DRAWINGS

The accompanying drawings are incorporated into and form a part of the specification to illustrate several examples of the present inventions. These drawings together with the description serve to explain the principles of the inventions. The drawings are only for the purpose of illustrating preferred and alternative examples of how the inventions can be made and used and are not to be construed as limiting the inventions to only the illustrated and described examples. Further features and advantages will become apparent from the following and more particular description of the various embodiments of the invention, as illustrated in the accompanying drawings, wherein.

DETAILED DESCRIPTION OF THE PREFERRED EMBODIMENT

Figure 1:
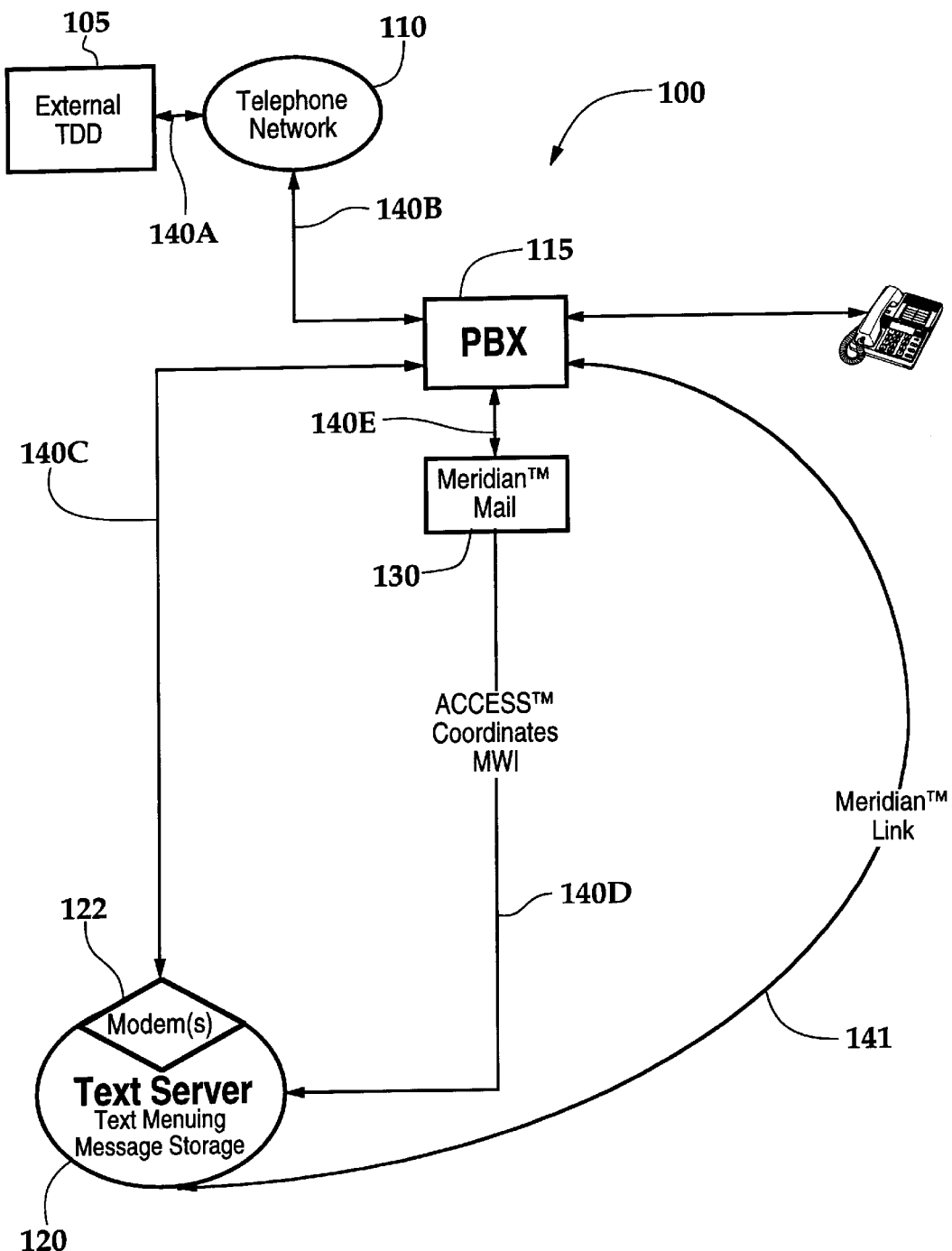
FIG. 1 is a system level diagram 100 illustrating a TDD configuration for messaging having at least one external TDD device 105, telephone network 110, PBX system 115, text server 120 (with internal modem(s) 122), Meridian Mail™ system 130, communication paths 140A, 140B, 140C, 140D, and 140E, and Meridian Mail™ link 141.

The present inventions will be described by referring to apparatus and methods showing various examples of how the inventions can be made and used. When possible, like reference characters are used throughout the several views of the drawing to indicate like or corresponding parts.

FIG. 1 shows system level diagram 100. Specifically, system level diagram 100 illustrates a system that is capable of answering and directing a TDD call generated from external TDD device 105 that travels through communication link 140A to telephone network 110. The TDD call is directed from telephone network 110 through communication link 140B to a port on PBX system 115. PBX system 115 is linked via communication link 140C to internal modem 122 on text server 120. Then, the TDD call is directed through communication link 140D through Meridian Mail ACCESS™ coordinates message waiting indication ("MWI") to Meridian Mail™ system 130, which is, in turn, linked to PBX system 115 through communication link 140 E. Meridian Mail™ link 141 provides a direct communication link between text server 120 and PBX system 115.

At the outset, please note that preferred embodiments will be connected to and work in conjunction with Northern Telecom™ and Nortel™ products, including, but not limited to, Nortel PBXs, Meridian Mail™, and Meridian Mail ACCESS™. Nortel PBXs are digital communication switches which employ several proprietary signaling formats to communicate digital signals from component to component. The components provide phone or network trunk access to the system or other telephony features as needed by the customer.

Meridian Mail™ is a voice mail system component manufactured by Northern Telecom. There are over 35,000 Meridian Mail™ systems worldwide and it is currently in its eleventh release of software. There are an estimated 12 million users. It is fully integrated with the Nortel™ family of PBXs in that it employs the digital format that is used by other components of the Nortel™ product family. It has a connection for two way digital voice transmission (proprietary digital loop) and a two way digital control link which has been sold in several proprietary versions. Meridian Mail™ is not compatible with other phone systems in this configuration, but other voice mail systems may be used in certain instances, so long as they have certain abilities and features: voice mail, auto attendant, call out, and external control. Additionally, the server itself can initiate telephone calls to the target or called party (see FIGS. 3 and 8).

Regarding the voice mail feature, voice mail systems in preferred embodiments have the ability for a caller to record an audio message and deliver the audio message to a specific mailbox and the ability for the mailbox holder of the specific mailbox to listen to the audio message. When the audio message is delivered to the mailbox, the voice mail system preferably has the ability to indicate that the message is in the mailbox, such as by lighting a light proximal to the user of the mailbox, altering the dial tone of the telephone instrument used the mailbox holder, calling the mailbox holder at a specified telephone using automated audio prompts to inform the mailbox holder that the message is in the mailbox, and sending a predetermined signal to a radio pager appropriate to the pager format and capabilities.

Regarding the auto attendant feature, voice mail systems in preferred embodiments also have the ability of providing a number of choices to a caller or called party, such as transferring the party connected to the auto attendant, recording a message for a specified mailbox, and playing a recording to the connected party.

Furthermore, regarding the call out feature, voice mail systems in preferred embodiments have the ability to call a specified number and present the answering party with a voice mail message or auto attendant feature.

Finally, regarding the external control feature, voice mail systems in preferred embodiments have the ability to be controlled by a computer that is separate from and external to the voice mail system itself. For instance, Meridian Mail™ can be connected digitally to a computer via a proprietary digital control link and associated software that is called Meridian Mail ACCESS™. Meridian Mail ACCESS™ allows a computer that is external to Meridian Mail™ to control Meridian Mail™ functions and features using Meridian Mail ACCESS™ applications program links ("APLs") according to programming resident on the external computer. Meridian Mail ACCESS™ has a number of advantages and features which make it suitable for preferred embodiments. Meridian Mail ACCESS™ is often used is telephone banking applications, where a call is made to Meridian Mail™ and the input of an account number by the caller using standard telephone signaling is processed by an external computer via Meridian Mail ACCESS™ to deliver an account balance to the caller via voice recording. Of course, there is a considerable amount of documentation and manuals that has been published, which explains how to program and operate Meridian Mail™, Meridian Mail ACCESS™, and Nortal's PBX, which, if necessary to understand the invention(s) described herein, is incorporated by reference.

Figure 2:
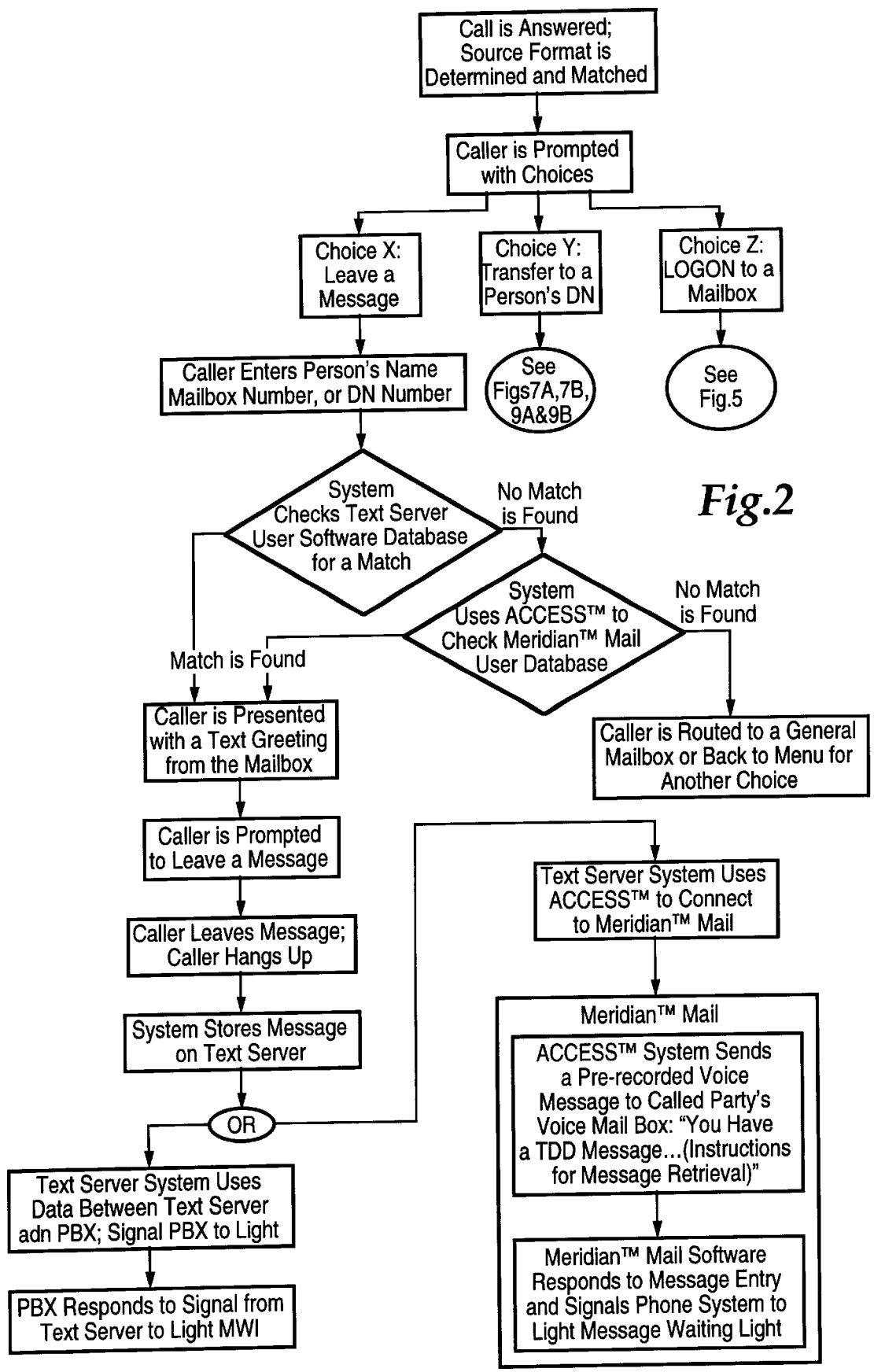
FIG. 2 is a flow diagram that illustrates a preferred process that is used to leave a message that is preferably implemented by system level diagram 100 shown in FIG. 1.

As shown in FIG. 2, a flow diagram of the preferred process implemented, in part, by system level diagram 100 is shown in FIG. 1. As discussed above, after a TDD call is initiated by a caller (e.g., a calling party, a first party) to a specific number (e.g., a called party, a second party) from external TDD device 105 and is connected via the telephone network 110 and received by a port on PBX system 115, the call is transferred to text server 120. Modem(s) 122 then recognizes the incoming call as being initiated by TDD device 105 that conforms to a Baudot format and converts the incoming signal to ASCII. A preferred embodiment of modem 122 is manufactured by NXi, Inc. of Utah. Note, however, some TTY devices can also transmit signals conforming to a format of 300 Baud ASCII and, in these instances, it is not necessary for modem 122 to convert the signal into ASCII, because it is already in ASCII, so standard modems can be used for modem 122. Furthermore, in response, modem 122 converts all outgoing signals to the appropriate format to match TDD device 105 (e.g., 45.45 Baudot or 300 or a greater rate Baud ASCII).

In preferred embodiments, once the TDD call is received and recognized as such, software instructs text server 120 to prompt caller with a variety of choices. Note, however, in alternate embodiments this prompting step can be bypassed and any one of the specific options automatically executed. Preferred embodiments provide a number of options: (i) leave a message; (ii) transfer to a persons telephone number; and (iii) log on to a specific mailbox. Note, not all of the options are necessarily available for every call. The choices listed above are examples of choices that a caller may have. These options form the basis of a bulletin board system, which will be able to perform any computation or present any option consistent with existing computer capabilities. Other options may be used in lieu of these options or added to these options.

If option (i) is chosen, the caller is then requested to provide specific information (e.g., the second party's name, the second party's employee number, the second party's social security number, the second party's computer address, the second party's mailbox number, and the second party's login name) that is needed to identify and/or locate the specific number or location of the second party. Once again, the caller then preferably enters a person's name, mail box number and/or telephone number. Next, text server 120 checks a first database of individuals having access subscriber services (e.g., registered users), which, in most cases, is comprised of individuals or numbers having access to subscriber text server 120 services. The first database is preferably a look-up table that is stored in the memory in or accessible by text server 120 and is accessed through software used by text server 120. The first database is the list of persons who are served by the associated PBX system 115 and/or voice mail system 130.

If the second party is in the database (and has access to text server 120), then text server 120 typically presents the caller with greeting from a mailbox holder and prompting the caller to leave a message. Then, after a message is left by the caller (if a message is left by the caller), the message is stored in memory to which text server 120 has access. And, finally a message that is common to this situation and preferably prerecorded is then sent from text server 120 through Meridian Mail ACCESS™ to voice mail system 130 to notify the second party (or parties having Meridian Mail ACCESS to a specific number) that the TDD call was received.

The second party may be notified in a number of ways. For instance, if Meridian Mail ACCESS™ is used along with Meridian Mail™ system, which is a product offered by Northern Telecom™, an actual voice message can be left in the voice mailbox for the second party generally stating that the TDD call was received. Also, note that if Meridian Mail™ system is used, a message light can be easily activated on a specific telephone that the second party has access to indicate that the message has been received. Alternatively, when the called party listens to the voice message sent from text server 120, the called party can stop play at any time. If the called party has previously received text messages and is aware of the procedure used to retrieve the text, the called party can stop play and retrieve the text message. If, however, the called party has not received a text message before and needs an explanation about what to do, instructions explaining the procedure used to retrieve text messages will be included in the voice message. Instructions can also be left telling the second party how to access a TDD call and how to retrieve the message (if the message is not automatically left in the second party's voice mailbox).

If the second party is not in the first database, then preferred embodiments check a second database of individuals having access to Meridian Mail™ system 130 to determine whether the second party has access to Meridian Mail™ system 130. At this point, if the second party is not in the voice mail database for Meridian Mail™ system 130, then the caller is routed to a general mailbox. Alternatively, if the second party is in the second database, then the caller is presented with a standard text greeting, prompted to leave a message, and the second party is alerted that a message is waiting through Meridian Mail™ system 130. As discussed below, note all of the greetings in all of these embodiments must be understandable to a deaf, hard-of-hearing, or speech impaired person, which is often in text.

Figure 3:
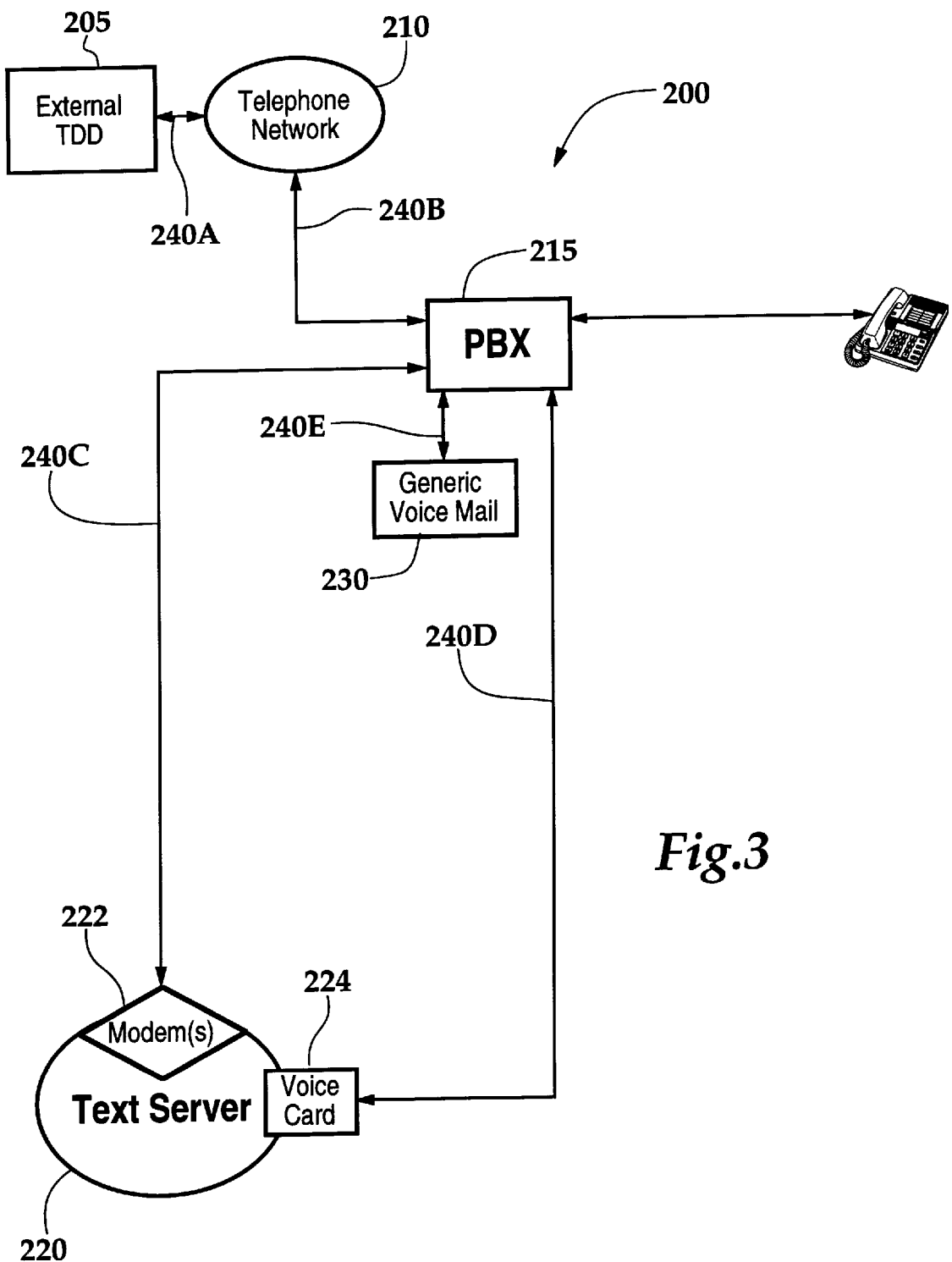
FIG. 3 is a system level diagram 200 having at least one external TDD device 205, telephone network 210, PBX system 215, text server 220 (with internal modem(s) 222 and voice card 224), voice mail system 230, and communication paths 240A, 240B, 240C, 240D, and 240E.

FIG. 3 is a system level diagram 200. Specifically, similar to FIG. 1, system level diagram 200 illustrates a system that is capable of answering and directing a TDD call generated from TDD device 205, which is external, that travels through communication link 240A to telephone network 210. And, a TDD call is directed from telephone network 210 through communication link 240B to a port on PBX system 215. PBX system 215 is linked via communication link 240C to internal modem 222 on text server 220. Then, the TDD call is directed through voice card 224 and through communication link 240D to PBX system 215, which is, in turn, linked to generic voice mail system 230 through communication link 240E. Voice card 224 on a server uses Audio Messaging Industry Standard ("AMIS"), which is a standard covering communication from voice mail system to voice mail system, or similar standard to send MWI messages to voice mail systems via a PBX, such as PBX system 215. Preferred embodiments of voice card 224 conform are manufactured by Dialogic Corporation or conform to a standards associated with voice mail interface cards. As discussed above, after a TDD call is initiated by a caller (e.g., a first party) to a specific number (e.g., a second party) from external TDD device 205, received, ultimately, by text server 220, the caller is prompted with several options (see above).

Figure 4:
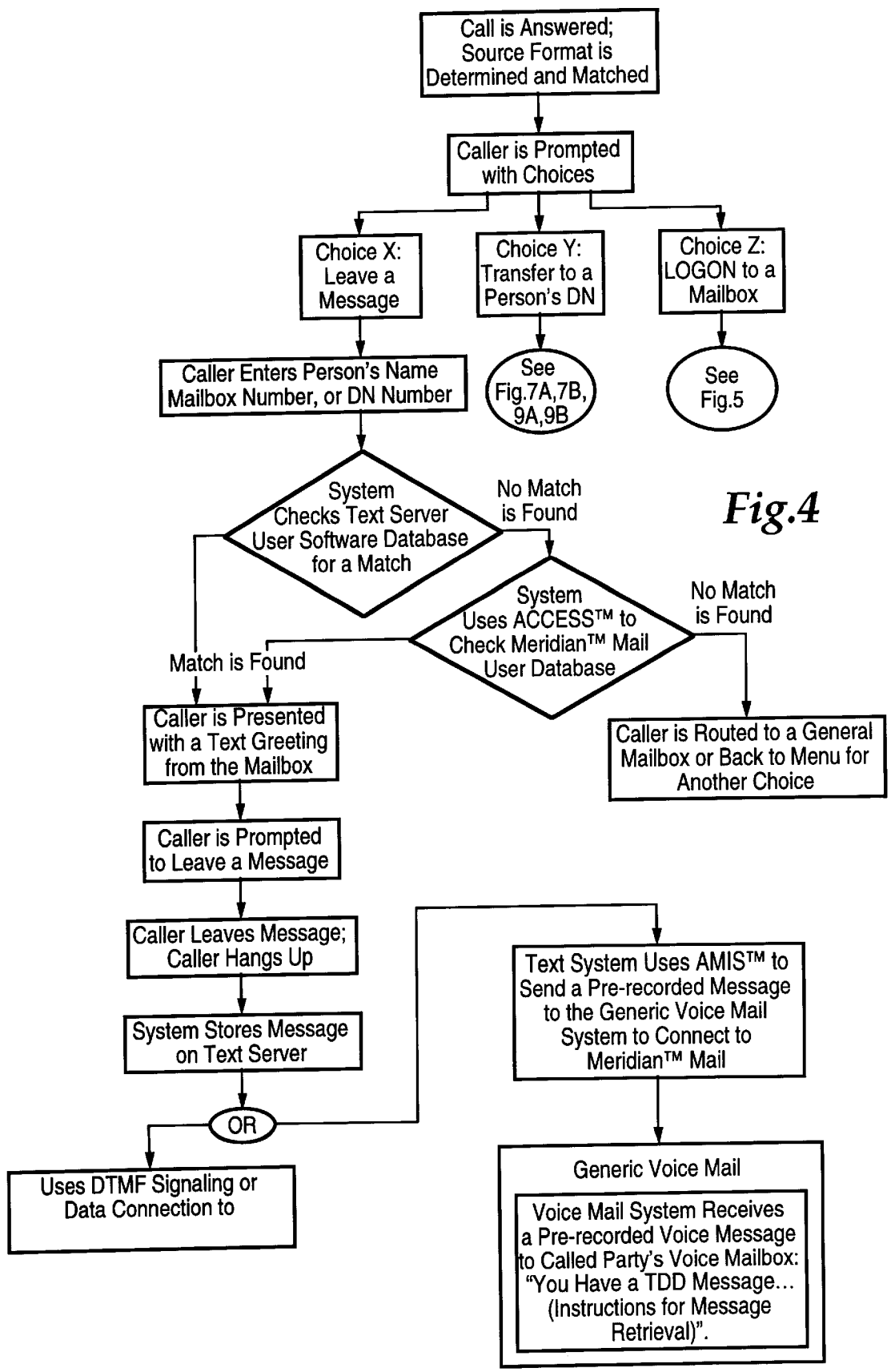
FIG. 4 is a flow diagram that illustrates a preferred process used to leave a message that is preferably implemented by system level diagram 200 shown in FIG. 3.

As shown in FIG. 4, if option (i) is chosen, the caller is then requested to provide specific information (e.g., the second party's name, the second party's employee number, the second party's social security number, the second party's computer address, the second party's mailbox number, and the second party's login name) that is needed to identify and/or locate the specific number or location of the second party. The caller then preferably enters a person's name, mail box number and/or telephone number. Next, text server 220 checks a first database of individuals having access to the port the TDD call was received, which, in most cases, is comprised of individuals or numbers having access to text server 220. The first database is preferably a look-up table that is accessible by text server 220 and is accessed through software used by text server 220.

If the second party is in then database (and has access to text server 220), then text server 220 typically presents the caller with greeting from a mailbox holder and prompting the caller to leave a message. Then, after a message is left by the caller (if a message is left by the caller), the message is stored in memory in which text server 220 has access (usually in text server 220). And, using AMIS, a prerecorded message is then sent from text server 220 to PBX system 215 via voice card 224 and, in turn, to generic voice mail system 230 to notify the second party (or parties having access to a specific number) that the TDD call was received. Voice card 224 is used to send a standardized audio message to voice mail system 230 via PBX system 215. The preferred standard method of signaling a phone system user that a message, such as a paper message at a reception phone or a voice message on a voice mail system, is waiting for them is a lighted light or other indication which is activated on the user's phone. This is called Message Waiting Indication ("MWI"). Text server 220, depending on the embodiment, will either use voice mail system 230 (e.g., Meridian Mail™) to signal MWI in response to a voice message left in the called party's voice mailbox in voice mail system 230 using Meridian Mail ACCESS™ via a voice card that signals PBX system 215 using standard phone set signaling methods, or via voice card 224 that sends a voice message to any voice mail system 230 that is AMIS compatible. Voice mail system 230 that is AMIS compatible will then activate MWI according to its programming in response to the voice message delivery. The prerecorded message is delivered via a standard AMIS call to generic voice mail system 230, stating, among other things, that a TDD message has been left and is accessible using the specified instructions.

However, if the second party is not in the first database, then preferred embodiments check a second database of individuals having access to voice mail system 230 to determine whether the second party has access to voice mail system 230. At this point, if the second party is not in the voice mail database for voice mail system 230, then the caller is automatically routed to a general mailbox or back to a menu of choices, one of which may be to leave a message in a general mailbox. Alternatively, if the second party is in the second database, then the caller is presented with the text greeting from the mailbox holder, prompted to leave a message, and, once a message is received, the second party is alerted that a message is waiting through voice mail system 230.

Also, although not explicitly shown in FIG. 4, other steps can be added if the second party is found in the second database of parties having access to voice mail system. Specifically, referring to FIG. 15A, text server 220 can use predefined, programmable parameters together with information found in voice mail system 230 to create a mailbox or login name in the text server 220 for the second party who has no text mailbox, which is referred to as the Auto-Build feature. The database in voice mail system 230 is checked via Meridian Mail ACCESS™. The Auto-Build feature (132) responds to the presence of the called party in the voice mail system 230 (e.g., Meridian Mail™) or other external (to the text server) database to build (create) a user mailbox on the text server system. The Auto-Build feature uses the information in the external database as the basis for creating a text mailbox. The information needed includes such things as where will the message be delivered, the phone number that has MWI capability, voice mailbox address so a voice message can be sent, e-mail address, fax phone numbers, a delivery notification via pager, the user's name. Once created, the text mailbox may be permanent or it may exist for a limited time, depending upon a number of variables, such as the length of time since the text mailbox was accessed (used), a set length of time, status of the user. Alternate voice mail systems 230 can be used for Meridian Mail™, so long as the data base other than voice mail system 230 allows access to its database such that the needed information can be obtained.

Figure 5:
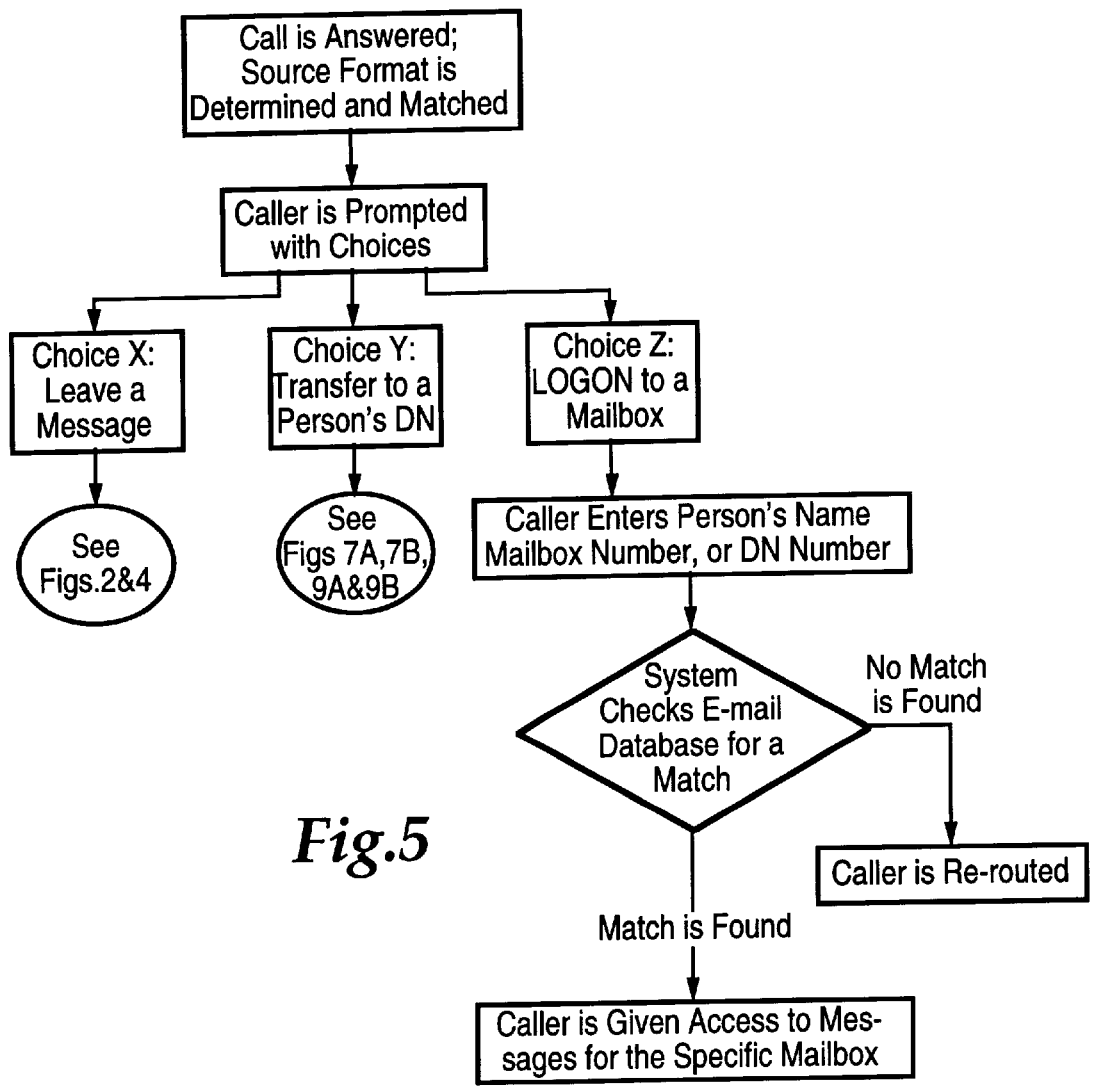
FIG. 5 is a flow diagram of a preferred procedure used to retrieve a message, which is preferably implemented by system level diagram 100 shown in FIG. 1 or system level diagram 200 shown in FIG. 3.

While FIGS. 2 and 4 detail alternate preferred procedures used to leave a message, FIG. 5 shows a flow diagram of a preferred procedure used to retrieve a message, which can be implemented by either of the systems shown in FIGS. 1 and 3. As shown in FIGS. 1 and 3, a text sever (e.g., text server 120 in FIG. 1 and/or text server 220 in FIG. 3) is in communication (directly or indirectly) with a voice mail system (e.g., Meridian Mail™ system 130 and/or voice mail system 230). This relationship provides for interaction between the voice mail system and the text server, such that when a TDD call is initiated by a caller and received by either system 100 or system 200 and the source format is determined and matched, one of the options presented, the third option (iii), is to log-in or check a mailbox. The mailbox may reside in the text server or another data base external to the text server. Identification information, such as a log-in ID, text mailbox number, etc., is typically requested by the system to access the mail box. Once entered, the text server check a database of party(ies) capable of accessing said mail box on the text server. If the caller is in the database, then the text server prompts the caller for a password and checks the password against a stored password corresponding to that mailbox to determine whether to grant access to the mail box. If the password matches the stored password, the caller can selectively retrieve messages from the mailbox in the text server another external database. If the password does not match the stored password, then the TDD call is terminated or the caller is returned to the menu. Through the text sever, the caller can also access and use features of the voice mail system, such as the ability to selectively delete messages in the voice mail system, direct messages, etc.

As described above, in light of the integration of the TDD/TTY devices into the text server (e.g., text server 120 in FIG. 1 and text server 220 in FIG. 3), the preferred embodiments provide a number of system wide features that were previously unavailable to the deaf, hearing-impaired, and/or speech impaired communities. For instance, the preferred embodiments shown in FIGS. 1 and 3 take messages and selectively deliver messages as text messages via a TTY device. Likewise, preferred embodiments deliver messages to e-mail or as a FAX. Also, preferred embodiments deliver messages as voice via text to voice conversion, which can be used for real time communication. Preferred embodiments use external databases as references for user "membership" in the system. Also, preferred embodiments deliver a pre-recorded message to the voice mail system that tells the user that a text message has arrived, thereby providing a signaling message to the hearing person that a deaf person has attempted to make contact and has left a message. Alternate signaling devices are also used to light MWI via Meridian Mail™ LINK™ directly to the Meridian Mail™ PBX or tel set signals via a voice card and using DTMF signals.

Note alternate systems require that DTMF be used to navigate the system, whereas preferred embodiments enable the caller to use the TDD keyboard, which is a much better approach for the deaf since they do not have to use the telephone dial pad. The telephone dial pad is awkward for the name dialing since only eight (8) numerals have associated letters and two letters, "q" and "z", are not represented. As a result, if one dials the name "Hansen" on a dial pad, the input to the voice mail system is 426736, which could also be "GAO???" or "Gan??" or "Gam??" etc. These alternate systems have to use numbers to find names. The preferred embodiment's enabling of the caller to use the TDD keyboard and the translation to ASCII name dialing is more efficient and easier to use. Furthermore, the command set for the TDD server can be more comprehensive, since letters and numbers are used rather than DTMF numbers. For example, the command for "Transfer" (which would be a number in a DTMF driven system) could be "transfer," "trans," "call," or "connect" et al. In short, the commands can be appropriate to the expected callers reference. Another advantage of input in text format is that the menu commands are structured such that none of the commands entered by the caller will conflict. The advantage to this strategy is that the caller can move from menu to menu and be prompted with choices in small groups or they can input the appropriate command as soon as they are connected and, thus, speed access to the service that they select without navigating from menu to menu. Finally, DTMF relies on audio feedback to assure the user that a signal is sent. TDD is visual and therefore better oriented to deaf users' needs.

Figure 6:
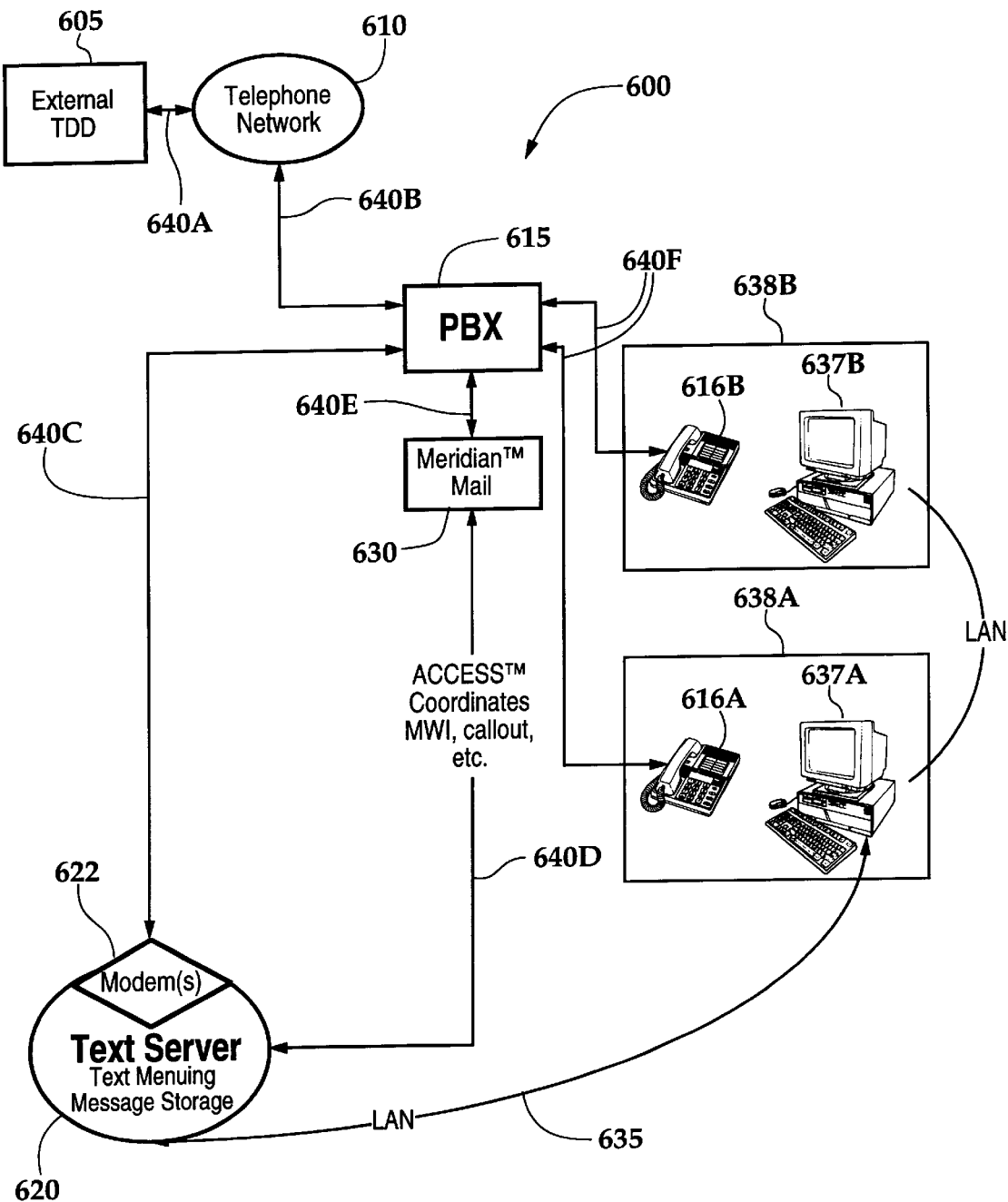
FIG. 6 is a system level diagram 600 having at least one external TDD device 605, telephone network 610, PBX system 615, text server 620 (with internal modem(s) 622), Meridian Mail™ system 630 (with Meridian Mail ACCESS™ coordinates) at least one combination 638A (having terminal device 637A and telephone 616A), communication paths 640A, 640B, 640C, 640D, 640E, and 640F, and local area network 635.

FIG. 6 is a system level diagram 600. Specifically, system level diagram 600 illustrates a system that is capable of answering and directing a TDD call generated from an external TDD device, such as external TDD device 605 that travels through communication link 640 A to a telephone network, such as telephone network 610. And, a TDD call is directed from telephone network 610 through communication link 640B to a port on PBX system 615. PBX system 615 is linked via communication link 640C to internal modem(s) 622 on text server 620. Then, a TDD call is directed through communication link 640D through Meridian Mail ACCESS™ coordinates MWI to Meridian Mail™ system 630, which is, in turn, linked to PBX system 615 through communication link 640E. PBX system 615 is, in turn, in communication with at least one telephones 616A and 616B through communication paths 240F. Text server 620 is in communication with terminal devices 637A and 637B (e.g., personal computers) via local area network ("LAN") 635. Telephone 616A and terminal device 637A are preferably grouped together on a single desktop, so that a receiving party at that location 638A has access to both telephone 616A and terminal device 637A simultaneously; telephone 616B and terminal device 637B are preferably grouped together on a single desktop, so that a receiving party at that location 638B has access to both telephone 616B and terminal device 637B. Note that the TDD call from the caller is routed through text server 620 and LAN 635 to terminal devices 637A and 637B, but PBX system 615, Meridian Mail™ system 630, and communication paths 640D, 640E, and 640F also work together to inform the receiving party to inform them that the TDD call is waiting. Thus, the system level configuration 600 utilizes both the terminal devices 638A and 637B and telephones 616A and 616B to enable the person initiating the TDD call, who is hearing impaired, and the called party, who hears, to communicate with one another. The called party can be notified with a prerecorded message, text to voice conversion of the Calling Line Identification ("CLID"), ANI, PBX and/or computer databases information (time, etc.) that they have a caller waiting via voice or phone display. The pre-recorded message preferably also informs the called party how to handle the call. CLID is the telephone feature that puts the telephone number of the caller in the called party's phone display. This CLID number can be used to customize the menu or other features that are presented to the TDD caller when they call the text server.

In addition, system level configuration 600 easily integrates with Automatic Call Distribution ("ACD") call centers by placing a call to the ACD queue while the TDD call is on hold. When an agent is available, the system will inform the agent via telephone 616A by a prerecorded message that the call is TDD and simultaneously connect the caller to the agent's (the receiving party's) terminal device 638A via LAN 635.

Figure 8:
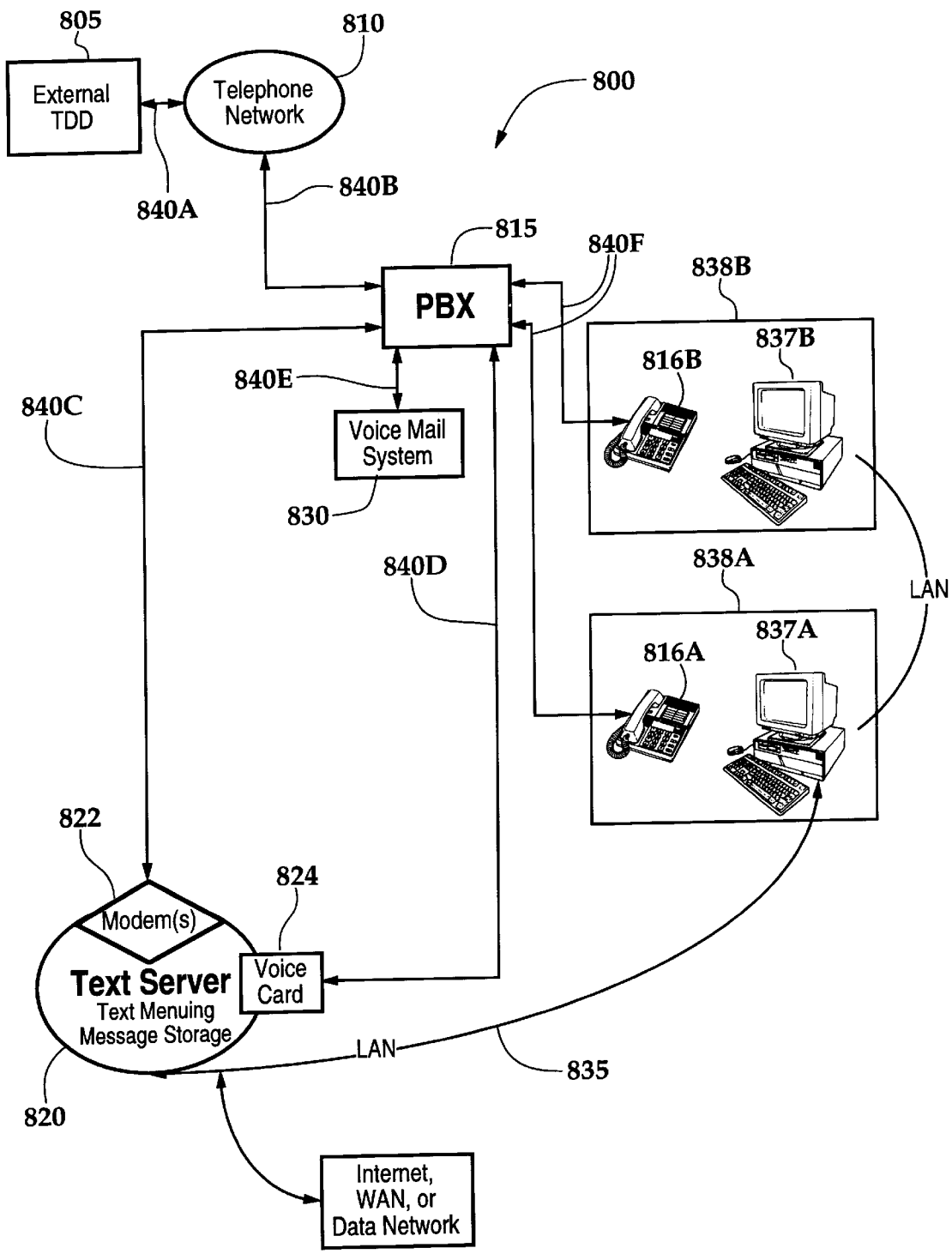
FIG. 8 is a system level diagram 800 having at least one external TDD device 805, telephone network 810, PBX system 815, text server 820 (with internal modem(s) 822 and voice card 824), voice mail system 830, communication paths 840A, 840B, 840C, 840D, 840E, and 840F, and local area network 835.

Similarly, FIG. 8 is a system level diagram 800, which is very similar to the system level diagram 600 in FIG. 6, the major difference being the use of the voice card 624 to link text server 820 to voice mail system 830. Once again, system level diagram 800 illustrates a system that is capable of answering and directing a TDD call generated from external TDD device 805 that travels through communication link 840A to telephone network 810. And, a TDD call is directed from telephone network 810 through communication link 840B to a port on PBX system 815. PBX system 815 is linked via communication link 840C to internal modem 822 on text server 820. Then, a TDD call is directed through voice card 824, communication link 840D to voice mail system 830, which is, in turn, linked to PBX system 815 through communication link 840E. PBX system 815 is, in turn, in communication with at least one telephones 816A and 816B through communication paths 840F. Text server 820 is in communication with terminal devices 837A and 837B (e.g., personal computers) via local area network ("LAN") 835. Telephone 816A and terminal device 837A are preferably grouped together on a single desktop, so that a receiving party at that location 838A has access to both telephone 816A and terminal device 837A simultaneously; telephone 816B and terminal device 837B are preferably grouped together on a single desktop, so that a receiving party at that location 838B has access to both telephone 816B and terminal device 837B. Note that the TDD call from the caller is routed through text server 820 and LAN 835 to terminal devices 837A and 837B, but PBX system 815, Meridian Mail™ system 830, and communication paths 840D, 840E, and 840F also work together to inform the receiving party to inform them that the TDD call is waiting. Thus, the system level configuration 800 utilizes both the terminal devices 838A and 837B and telephones 816A and 816B to enable the person initiating the TDD call, who is hearing impaired, and the called party, who hears, to communicate with one another. The called party can be notified with a prerecorded message, text to voice conversion of the CLID, ANI, PBX and/or computer databases information (time, etc.) that they have a caller waiting via voice or phone display. The pre-recorded message preferably also tells the called party how to handle the call.

Figure 10:
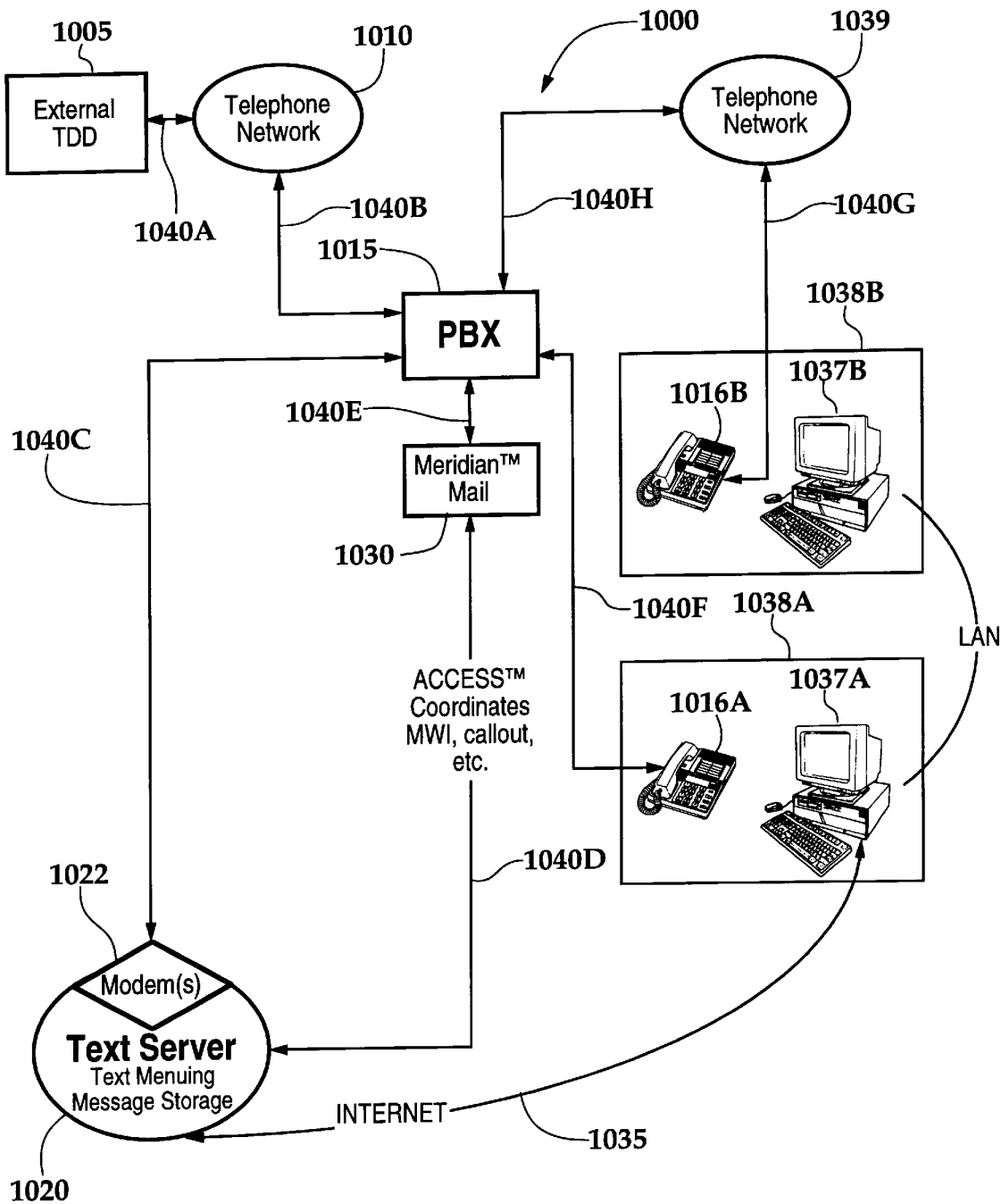
FIG. 10 is a system level diagram 1000 having at least one external TDD device 1005, telephone network 1010, PBX system 1015, text server 1020 (with internal modem(s) 1022), Meridian Mail™ system 1030 (with Meridian Mail ACCESS™ coordinates), at least one combination 1038A (having terminal device 1037A and telephone 1016A), communication paths 1040A, 1040B, 1040C, 1040D, 1040E, 1040F, 1040G, and 1040H, and Internet-based communication link 1050.

Likewise, FIG. 10 is a system level diagram 1000, which is very similar to the system level diagram 1000 in FIG. 6 and the system level diagram 800 in FIG. 8, the major difference being the use of the alternate networks, such as the Internet, for LAN 635 in system level diagrams 600 and 800 to link text server 1020 to terminal devices 1037A and 1037B. Once again, system level diagram 1000 illustrates a system that is capable of answering and directing a TDD call generated from an external TDD device 1005 that travels through communication link 1040A to telephone network 1010. And, a TDD call is directed from telephone network 1010 through communication link 1040B to a port on PBX system 1015. PBX system 1015 is linked via communication link 1040C to internal modem(s) 1022 on text server 1020. Then, a TDD call is directed through communication link 1040D through Meridian Mail ACCESS™ coordinates MWI to Meridian Mail™ system 1030, which is, in turn, linked to PBX system 1015 through communication link 1040E. PBX system 1015 is, in turn, in communication with at least one telephones 1016A and 1016B through communication paths 1040F via the public network 1039 or direct from the PBX 1015 through communication paths 1040F, 1040G, and 1040H. Text server 1020 is in communication with terminal devices 1037A and 1037B (e.g., personal computers) via network connection 1035. Telephone 1016A and terminal device 1037 A are preferably grouped together on a single desktop, so that a receiving party at that location 1038A has access to both telephone 1016A and terminal device 1037 A simultaneously. Similarly, telephone 1016B and terminal device 1037B are preferably grouped together on a single desktop, so that a receiving party at that location 1038B has access to both telephone 1016B and terminal device 1037B. Note that the TDD call from the caller is routed through text server 1020 and network connection (e.g., Internet) 1035 to terminal devices 1037A and 1037B, but PBX system 1015, Meridian Mail™ system 830, and communication paths 1040D, 1040E, and 1040F also work together to inform the receiving party to inform them that the TDD call is waiting. Thus, the system level configuration 1000 utilizes both the terminal devices 1038A and 1037B and telephones 1016A and 1016B to enable the party initiating the TDD call, who is often hearing impaired, to communicate with the called party when the called party, who is not hearing impaired. The called party can be notified with a prerecorded message, text to voice conversion of the CLID, ANI, PBX and/or computer databases information (time, etc.) that they have a caller waiting via voice or phone display. The pre-recorded message preferably also tells the called party how to handle the call.

Call Center features are those features that answer a call with an announcement, hold a call in queue until an appropriate person can answer the call, and then connect the call. For example, it might say, "Please remain on the line. Your call will be answered by the first available agent. It will be answered in the order in which it was received." There is no other existing system that allows TDD callers to be in queue (other than relay services). Preferred embodiments allow the caller to "be in queue" since the PBX handles the call as a standard voice call.

Figure 7A:
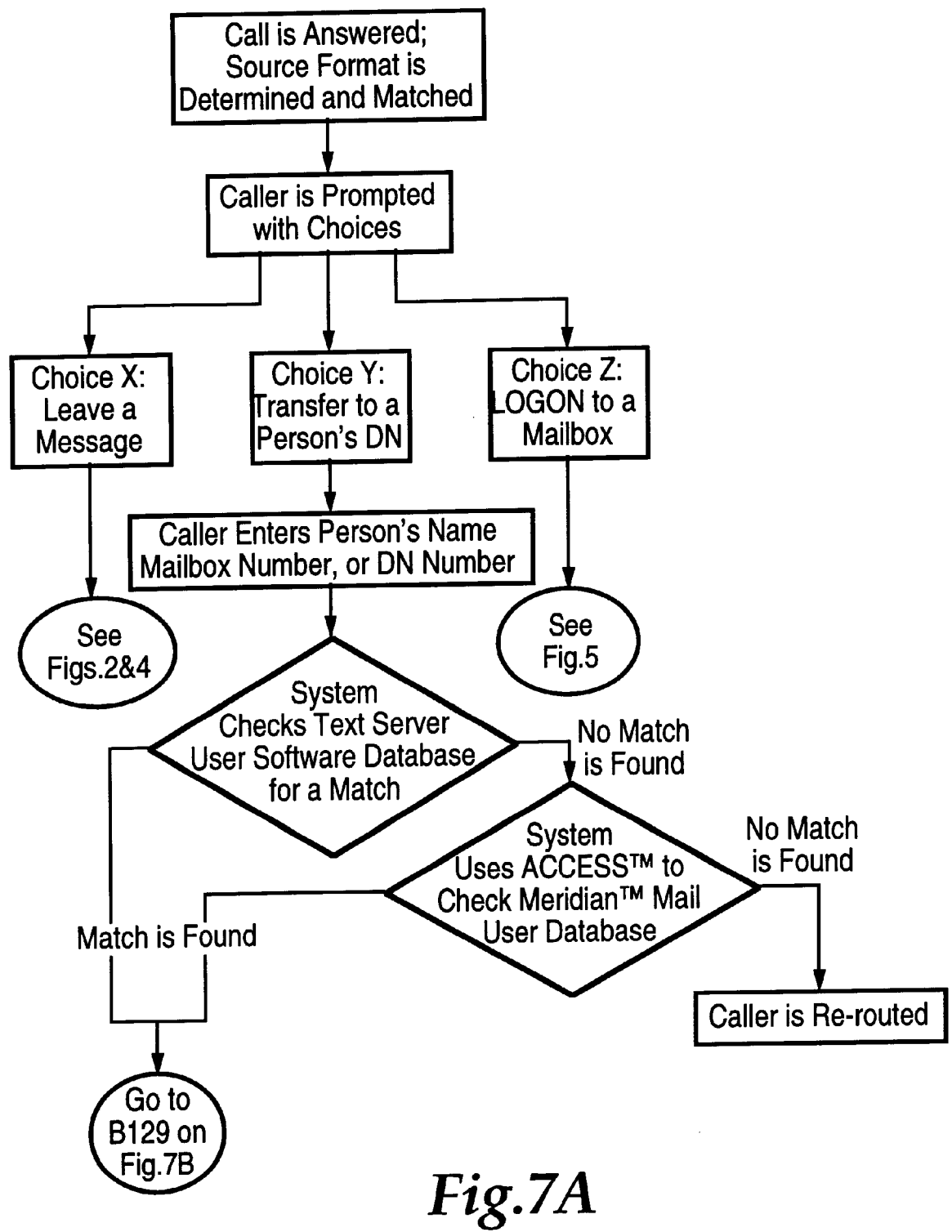
FIGS. 7A and 7B are flow diagrams that when combined illustrate a preferred process used to establish a real time chat that is preferably implemented by system level diagram 600 shown in FIG. 6.
Figure 7B:
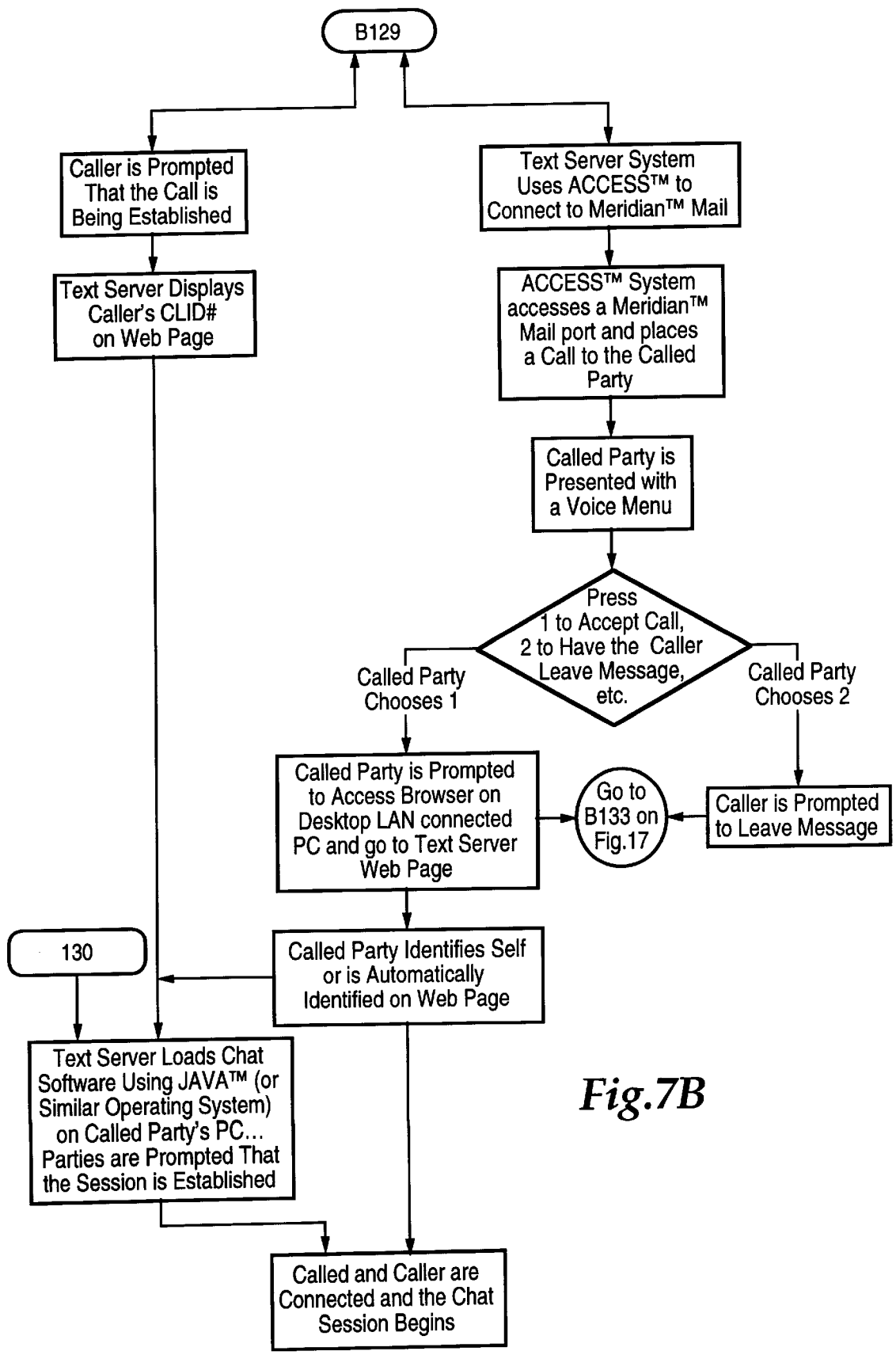
Figure 9A:
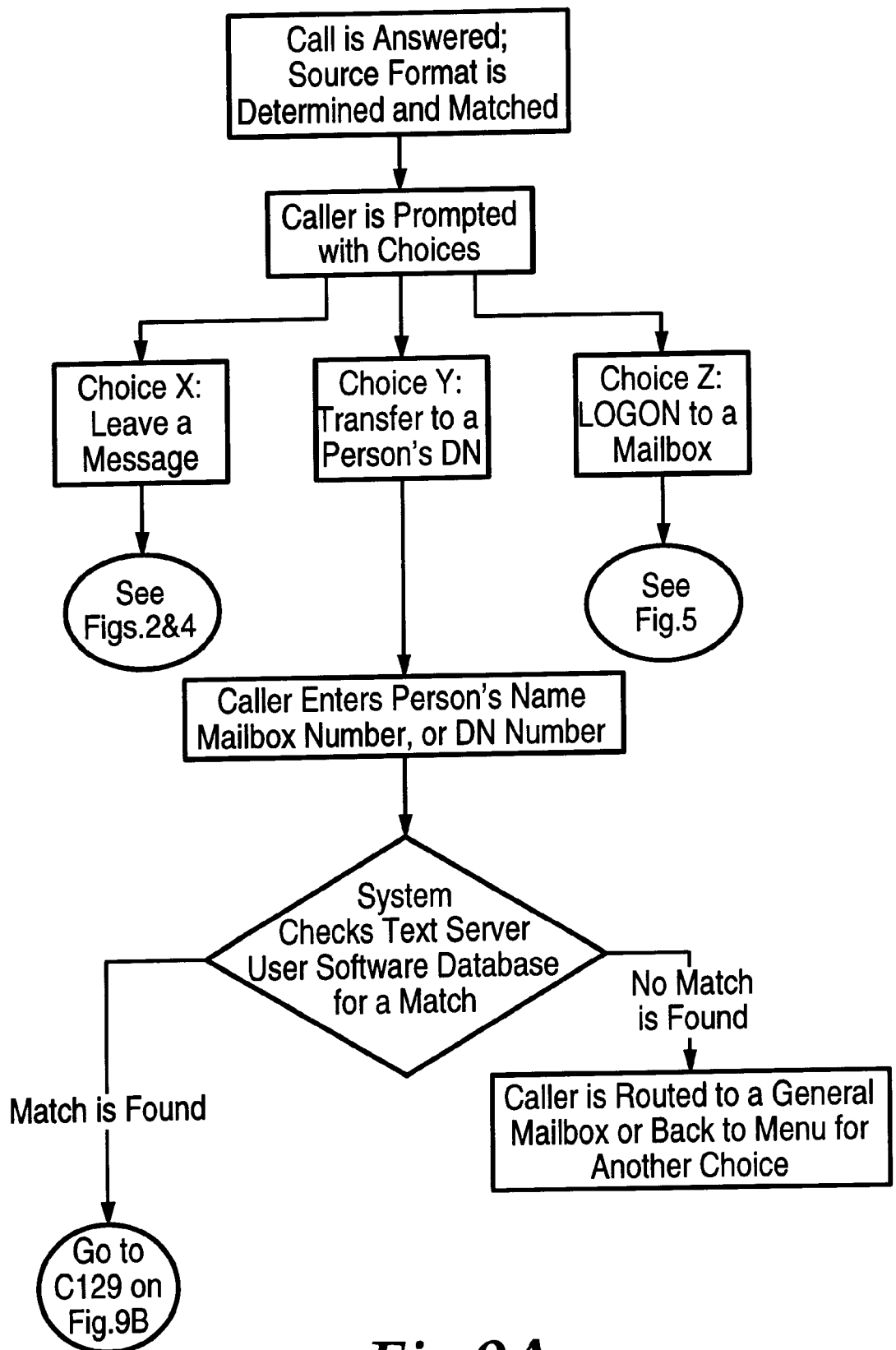
FIGS. 9A and 9B are flow diagrams that when combined illustrate a preferred process used to establish a real time chat (when a voice card is used to signal), which is preferably implemented by system level diagram 800 shown in FIG. 8.
Figure 9B:
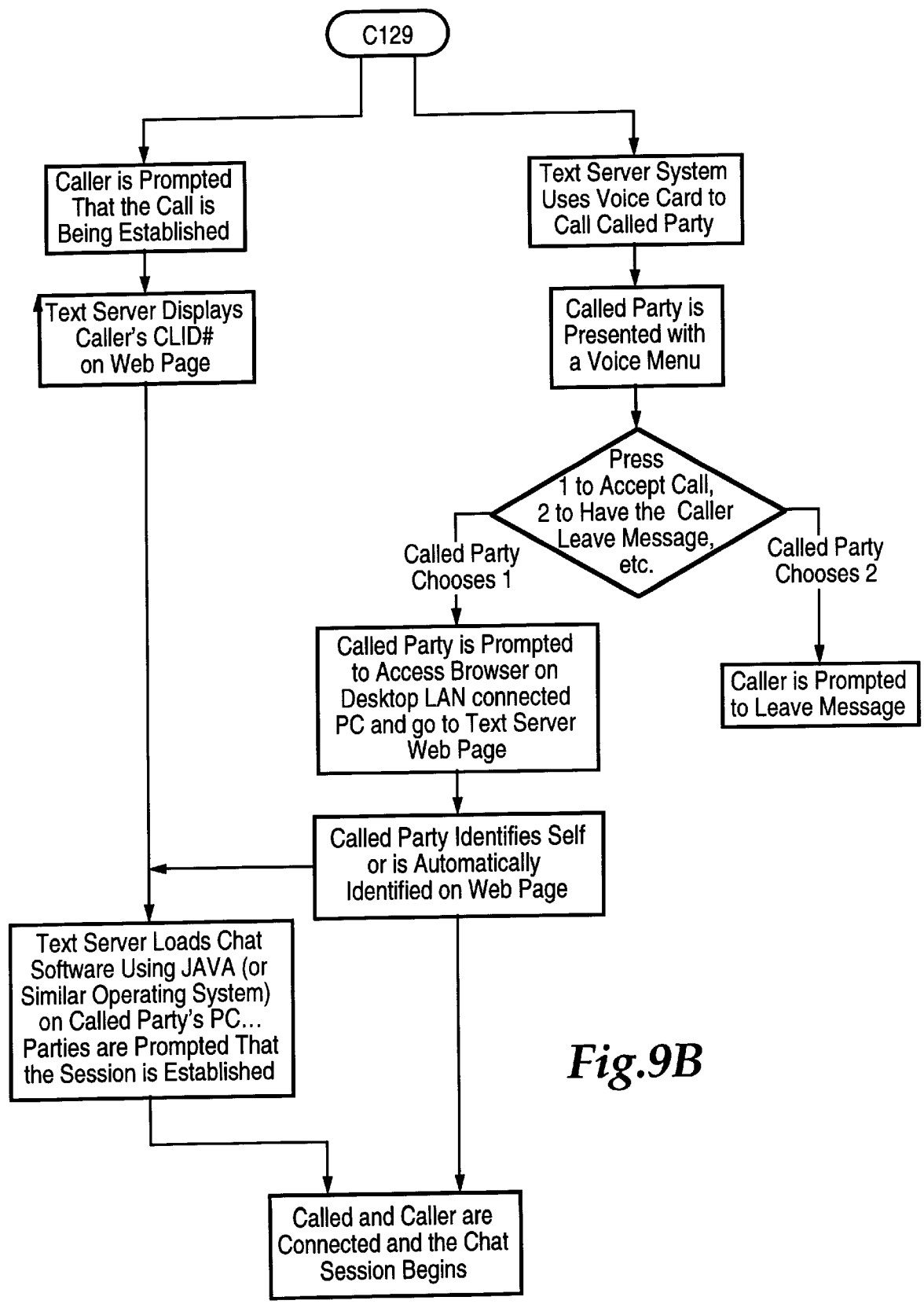
Figure 17:
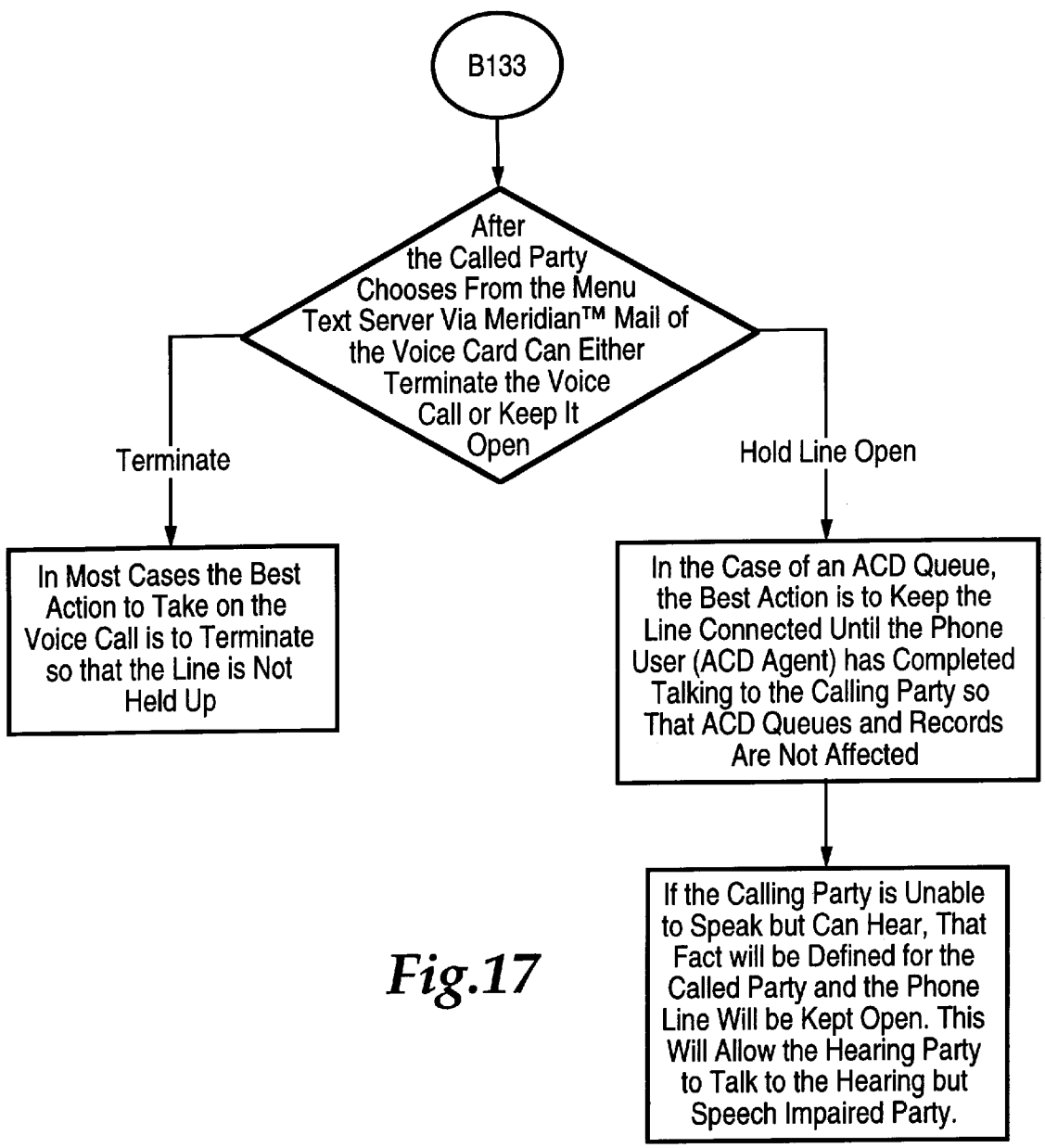
FIG. 17 is a flow diagram that illustrates how the operation of Automatic Call Distribution ("ACD") systems are integrated with preferred embodiments.

FIGS. 7A and 7B are flow diagrams that illustrate a preferred process used to establish a real time chat, in which Meridian Mail ACCESS™ is the preferred signaling method, as implemented by system level diagram 600 shown in FIG. 6, or, alternatively, Java™ or other similar programs are used to establish the chat communication, as preferably implemented by system level diagram 800 shown in FIG. 8. Similarly, FIGS. 9A and 9B are flow diagrams that when combined illustrate a preferred process implemented by system level diagram 800 shown in FIG. 8, the major difference being the use of voice card 824 in system level diagram 800 and the use of the network connection to establish the communication link between the calling party and the second party. The flow chart shown in FIG. 17 illustrates how ACD systems are integrated with the preferred embodiment shown in FIG. 7B.

Specifically, as shown in FIGS. 7A and 9A, once a TDD call is initiated by a first party to a second party and traveling over telephone network 610 (in FIG. 6) or telephone network 810 (in FIG. 8), the TDD call is received in a port adapted to receive the TDD call and the format of the source is determined and matched. Preferred embodiments then request the calling party provide identification information to identify second party. As stated above, identification information includes, but is not limited to, the second party's first name, the second party's employee number, the second party's social security number, the second party's computer address, the second party's mailbox number, the second party's login name, the second party's last name, the second party's full name, the second party's individual telephone number, assigned numbers, department name or number ACD agent number/ID, E-Mail address, computer IP address, and physical location (e.g., street address, cube name or number, office name or number, product name, line, job title). Then, once the identification information is entered, preferred embodiments check a database of individuals having access to the port to determine whether the second party is in the database and has access to the port. If the identification information is matched to an entry in the data base, then preferred embodiments establish a communication link between the first party and the second party, perhaps, after notifying the calling party that a communication link between the calling party and the second party is being established and, ultimately, is established.

As shown in FIGS. 6 and 8, the second party has a computer electrically coupled to (and in communication with) the port adapted to receive the TDD call and software needed to establish the communication may have to loaded on the second party's terminal device (e.g., terminal device 637, such as a personal computer (in FIG. 6) or terminal device 837, such as a personal computer (in FIG. 8)) to handle the TDD call, so that the communication link via LAN 635 (in FIG. 6) or network connection 835 (in FIG. 8) between the calling party and the second party can be made.

In particular, if the second party (the party being called) is not there or does not answer and is in the database, referring to the system diagram shown in FIGS. 6 and 8 and the flow diagram shown in FIGS. 7B and 9B, then preferred embodiments connect the first party to a voice mail system 630 (in FIG. 6) and voice mail system 830 (in FIG. 8), and initiate a call to the second party using voice mail system 630 (in FIG. 6) and 830 (in FIG. 8). Preferred embodiments notify the first party to leave a message; and, if the first party desires, record a message left by the calling party for the second party on the text server system. In addition, text server 820 uses voice card 824 to make the connection to the second party.

Alternatively, if the second party (the called party) answers, as shown in FIGS. 7B and 9B, either the caller can select option (ii) (discussed above) to establish a real-time chat with the second party or the second party can select an option that allows the second party to establish a real-time chat with the calling party. In reference to the calling party, the calling party is prompted that the chat or real time communication link is being established. Text server 620 (in FIG. 6) makes the connection through LAN 635 to the second party's terminal device (e.g., personal computer 637A) or text server 820 (in FIG. 8) displays the calling party's calling line identification name on the web page and (using JAVA or a similar operating system) loads the necessary software needed to establish the communication link over the Internet to the second party's terminal device (if the necessary software is not already there). Once the communication link is established, the chat session can begin. Preferred embodiments generally notify both parties that the communication link has been established.

Figure 11A:
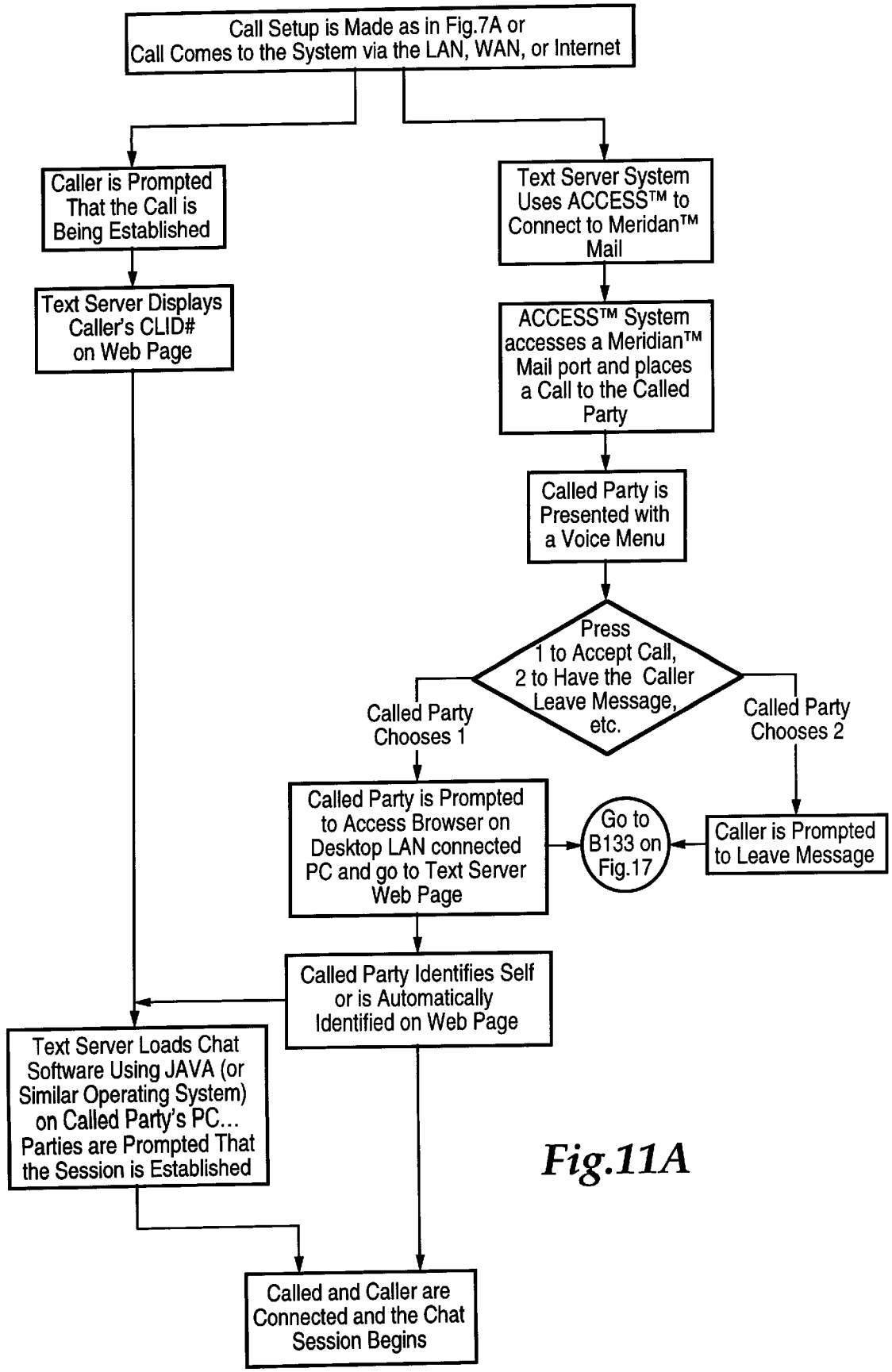
FIGS. 11A, 11B, 11C, 11D, 11E, and 11F are flow diagrams that illustrates a preferred process implemented by system level diagram 1000 shown in FIG. 10.

FIGS. 11A, 11B, 11C, 11D, 11E, and 11F are flow diagrams that illustrate a preferred process implemented by system level diagram 1000 shown in FIG. 10. FIG. 11A is the flow chart used to establish a real time chat connection via an Internet Browser program. Once the call setup is made with the procedure shown in FIG. 7A, the first party (caller) is prompted that the TDD call is being established. Then, text server 1020 the caller's CLID # on a Internet Web Page and, using JAVA or similar software, loads 'chat' software on the second party's terminal device 1037A, so that the chat session can begin. Simultaneously, text server 1020 uses Meridian Mail ACCESS™ to connect to Meridian Mail™ system 1030 to place a call to the second party. The second party is presented with a voice menu with the following options: (i) press "1" to accept call or (ii) press "2" to have the first party to leave a message. If the second party chooses option (i), the second party is prompted to access the browser via the terminal device 1037 A (e.g., desk-top LAN personal computer) and go to a web page that is in communication with text server 1020. Once the second party identifies himself or is otherwise automatically identified on the web page, text server 1020, using JAVA or similar software, loads 'chat' software on the second party's terminal device 1037A, so that the chat session can begin. If the second party does not identify himself, then the call is handled in the manner already discussed above in relation to FIGS. 2 and 4, depending upon how the system is connected. Alternatively, if the second party chooses option (ii), then the caller is prompted to leave a message, using the procedure already discussed above in relation to FIGS. 2 and 4, depending upon how the system is connected. The flow chart shown in FIG. 17 illustrates how an ACD system is integrated with the preferred embodiment shown in FIG. 11A.

Figure 11B:
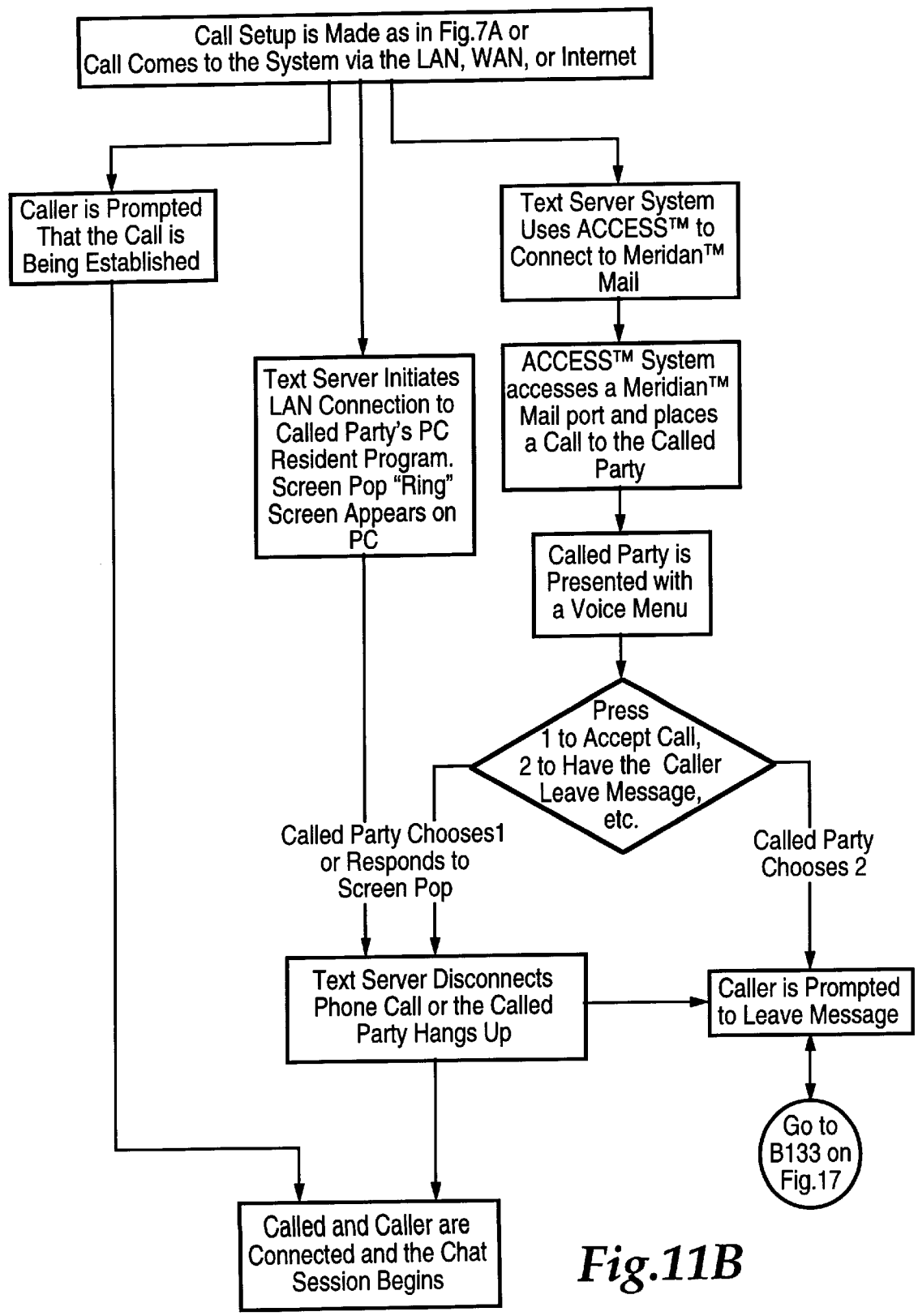

FIG. 11B shows the flow chart for a real time chat when the connection is made via personal resident software. Once the call setup is made with the procedure shown in FIG. 7A, the first party (caller) is prompted that the TDD call is being established. Simultaneously, text server 1020 initiates LAN connection to the second party's terminal device, terminal device 1038 A, text server 1020 displays a "ring" screen on terminal device 1038 A, having a number of options, such as option (i) press "1" to accept the telephone call or (ii) to have the first party leave a message. If the second party presses "1" or otherwise responds to the options displayed, the chat session begins. Likewise, if the second party presses "2", the first party is prompted to leave a message and the procedure described above in relation FIGS. 2 and 4, depending upon how the system is connected, is used to record the message. Also, simultaneously, text server 1020 uses Meridian Mail ACCESS™ to connect to Meridian Mail™ system 1030 to access a port and place a call to the second party. And, when the called party answers telephone 1016A, the second party is verbally presented with a number of options similar to those displayed on terminal device 1037A or verbal instructions to check terminal device 1037A for the options displayed. The flow chart shown in FIG. 17 illustrates how an ACD system is integrated with the preferred embodiment shown in FIG. 11B.

Figure 11C:
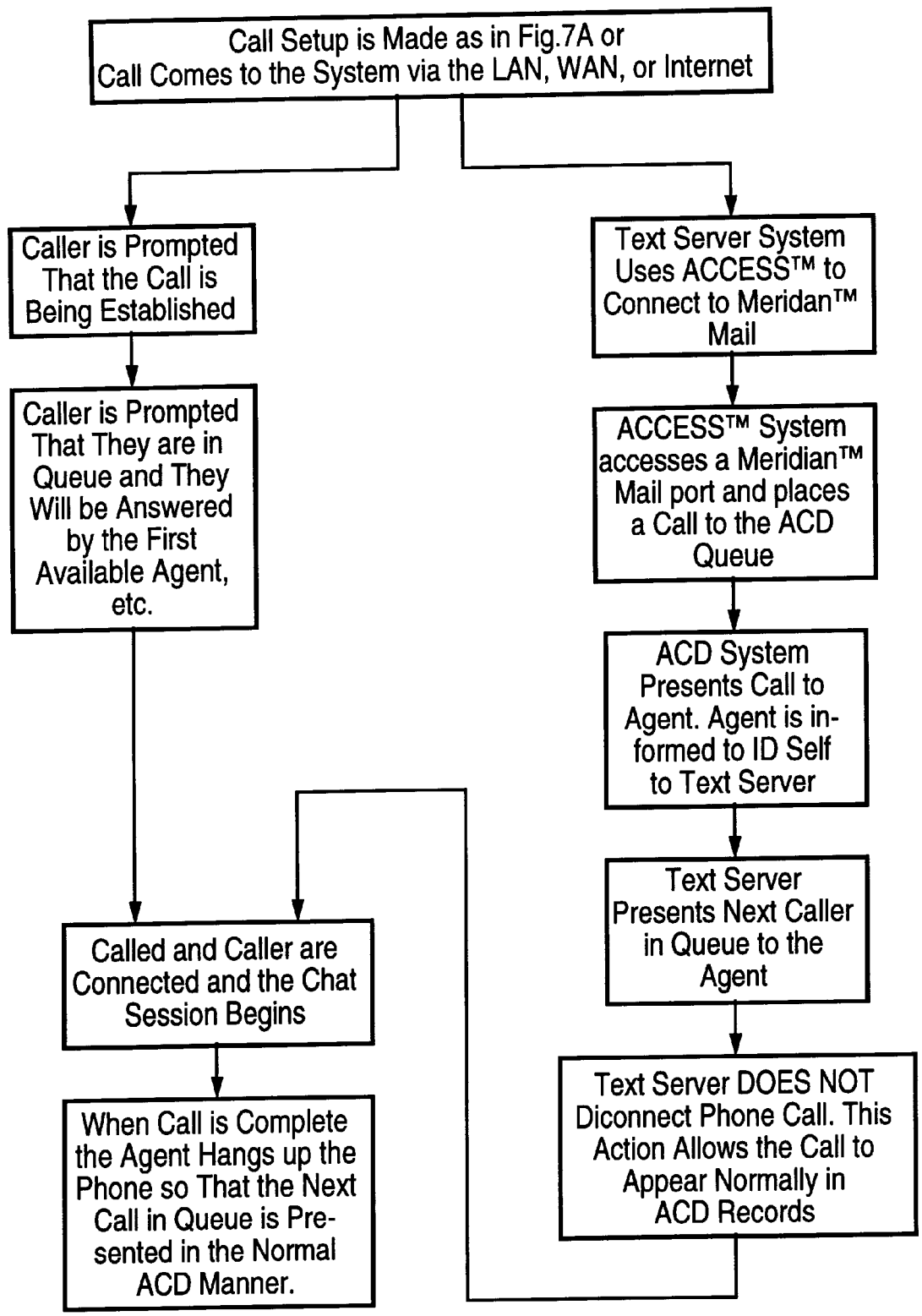

FIG. 11C shows the flowchart used to establish a real time chat, when the connection is mad via software that is resident on terminal device 1038A, such as on a personal computer. Once the call setup is made with the procedure shown in FIG. 7A, the first party (caller) is prompted that the TDD call is being established and then that they are in queue and will be answered by the first available agent, etc. Then, the second party and first party are connected and the chat session begins. Simultaneously, text server 1020 uses Meridian Mail ACCESS™ to connect to Meridian Mail™ system 1030 to connect to a port and place the call initiated by first party in the ACD queue. The ACD presents the call to the agent. The agent is instructed to identify himself to the text server. Text server presents next caller in queue to the agent. Note text server 1020 does not disconnect the phone call, which allows the call to appear normally in ACD records. Once the call in complete, the agent hands up the telephone, so that the next call in queue is presented in the normal ACD manner.

Figure 11D:
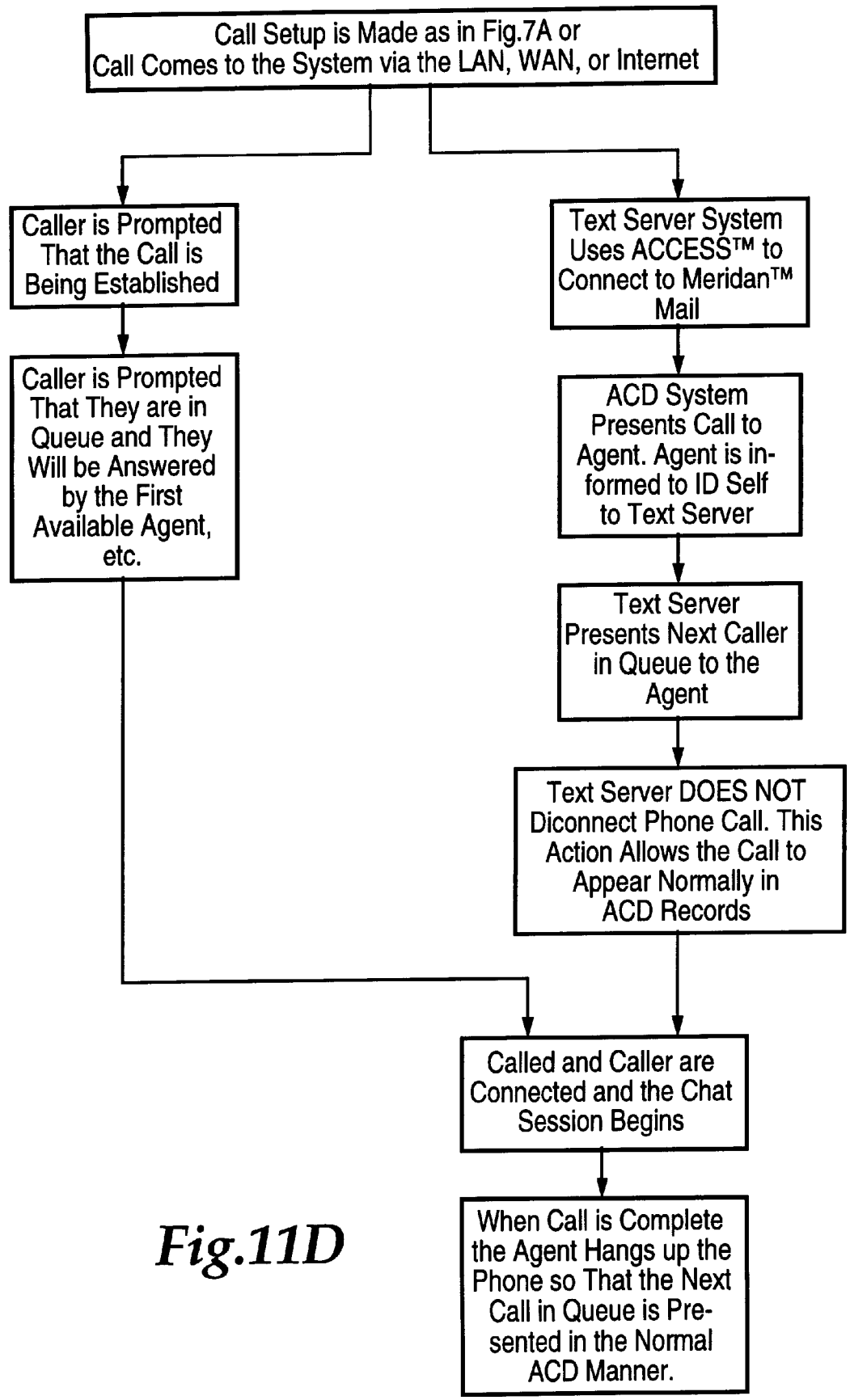

FIG. 11D shows the flowchart used to establish a real time chat, when the connection is made via software residing in terminal device 1037A n an ACD environment and voice card is used as the audio connection means. Once the call setup is made with the procedure shown in FIG. 7A, the first party (caller) is prompted that the TDD call is being established and then that they are in queue and will be answered by the first available agent, etc. Then, the second party and first party are connected and the chat session begins. Simultaneously, text server 1020 access voice card port and places a call to the ACD queue. The ACD system presents the call to the agent. The agent is instructed to identify himself to the text server. Text server presents next caller in queue to the agent. Note text server 1020 does not disconnect the phone call, which allows the call to appear normally in ACD records. Once the call in complete, the agent hands up the telephone, so that the next call in queue is presented in the normal ACD manner.

Figure 11E:
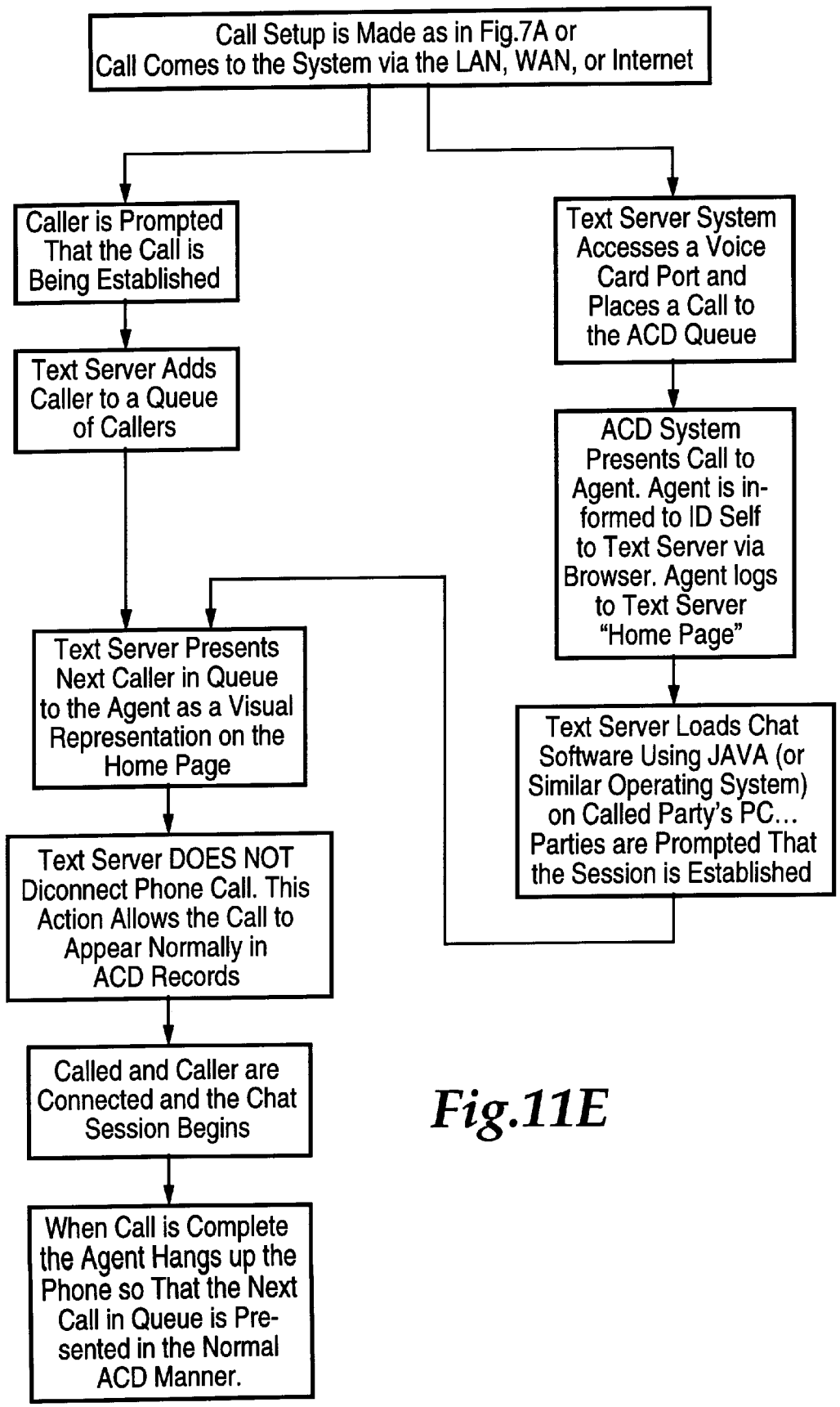

FIG. 11E shows the flowchart used to establish a real time chat, when the connection is made via browser software in an ACD situation and voice card is used as the audio connection means. Once, the call setup is made with the procedure shown in FIG. 7A, the first party (caller) is prompted that the TDD call is being established and then that they are in queue and will be answered by the first available agent, etc. Then, text server 1020 presents the next caller in queue to the agent as a visual representation on the home page. Note text server 1020 does not disconnect the phone call, which allows the call to appear normally in ACD records. Then, the second party and first party are connected and the chat session begins. Simultaneously, text server 1020 access voice card port and places a call to the ACD queue. The ACD system presents the call to the agent. The agent is instructed to identify himself to the text server via the browser and the agent goes to the text server "home page." Text server loads chat software using JAVA or similar program on the second party's terminal device 1037A. If there is more than one caller on the text server, then text server presents next caller in queue to the agent. Once the call in complete, the agent hangs up the telephone, so that the next call in queue is presented in the normal ACD manner.

Figure 11F:
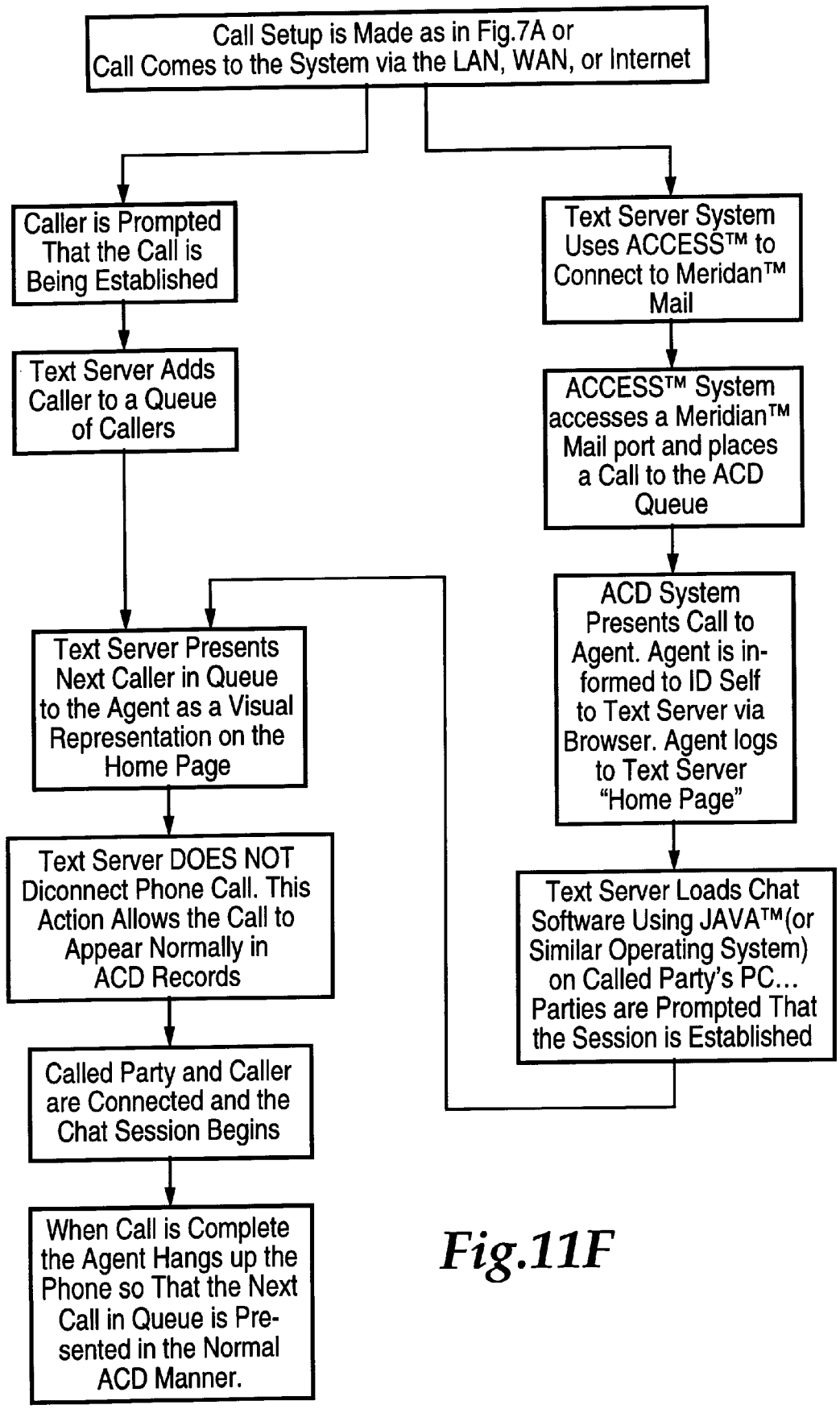

FIG. 11F shows the flowchart used to establish a real time chat, when the connection is made via browser software in an ACD situation and Meridian Mail ACCESS™ is used as the audio connection means. Once, the call setup is made with the procedure shown in FIG. 7A, the first party (caller) is prompted that the TDD call is being established and then that they are in queue and will be answered by the first available agent, etc. Then, text server 1020 presents the next caller in queue to the agent as a visual representation on the home page. Note text server 1020 does not disconnect the phone call, which allows the call to appear normally in ACD records. Then, the second party and first party are connected and the chat session begins. Simultaneously, text server 1020 uses Meridian Mail ACCESS™ to connect to Meridian Mail™ system to connect to a port and place a call to the ACD queue. The ACD system presents the call to the agent. The agent is instructed to identify himself to the text server via the browser and the agent goes to the text server "home page." Text server loads chat software using JAVA or similar program on the second party's terminal device 1037 A. Text server presents next caller in queue to the agent. Once the call in complete, the agent hands up the telephone, so that the next call in queue is presented in the normal ACD manner.

Figure 12:
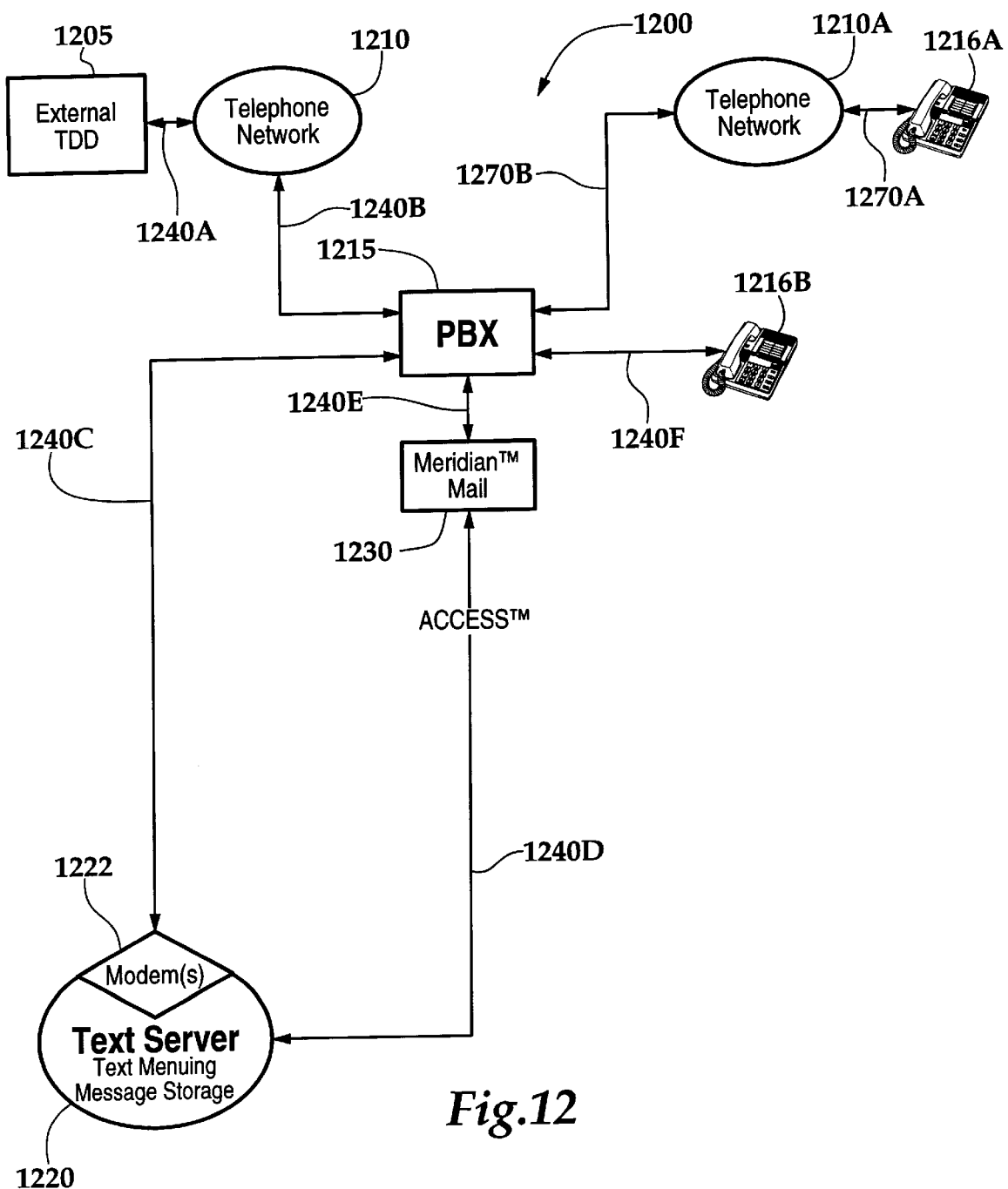
FIG. 12 is a system level diagram 1200 having at least one external TDD device 1205, telephone network 1210, PBX system 1215, text server 1220 (with internal modem 1222), Meridian Mail™ system 1230 (with Meridian Mail ACCESS™ coordinates), communication paths 1240A, 1240B, 1240C, 1240D, 1240E, 1240F, 1270B, and 1270A, second telephone network 1210A, and telephone instruments 1216A and 1261B.
Figure 13:
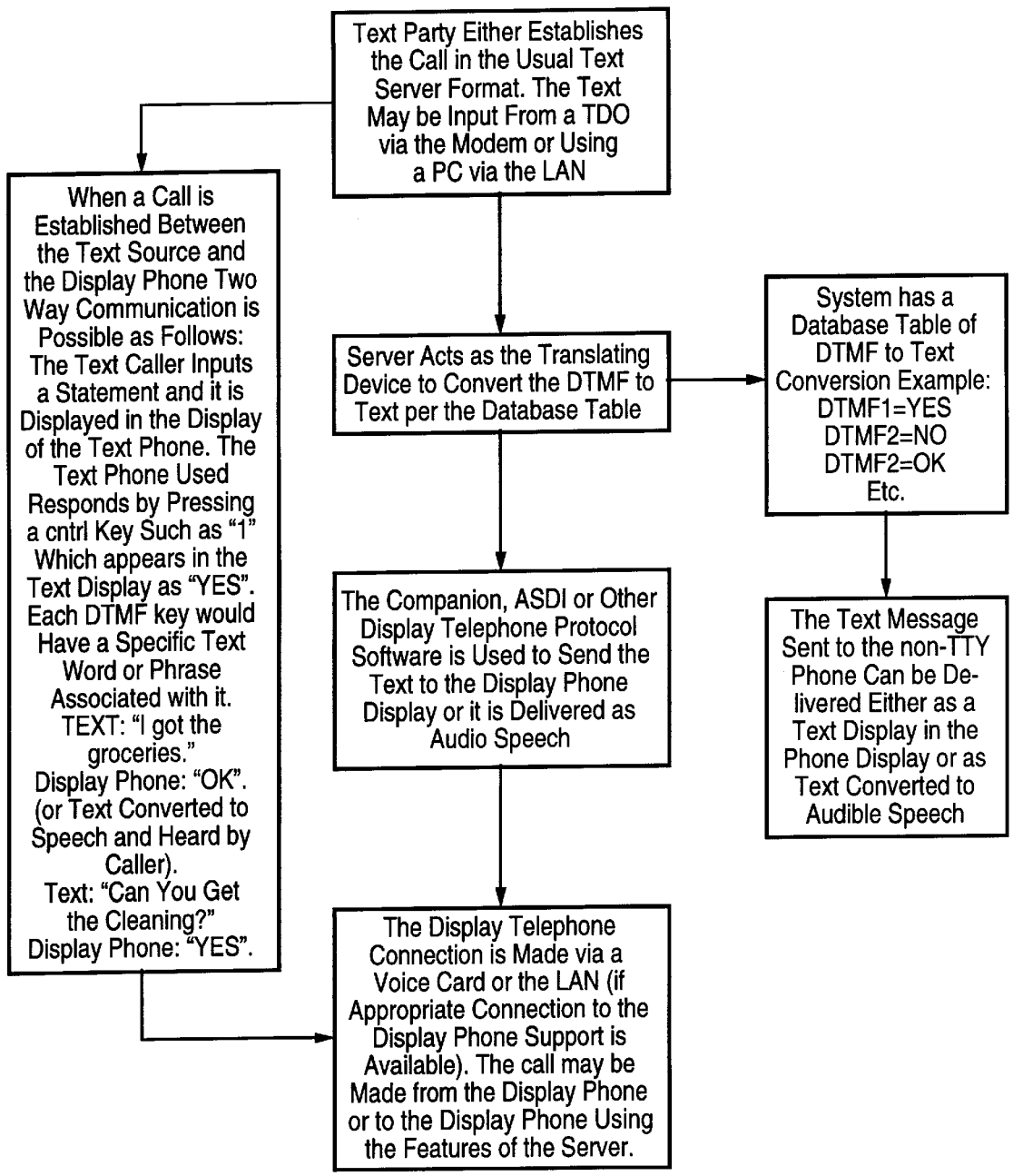
FIG. 13 is flow diagram that illustrates a preferred process used to convert Dual Tone Multi Frequency ("DTMF") to text in order to establish real time communication via a text server from either the desktop or TDD device and a display telephone, which is preferably implemented by system level diagram 1200 shown in FIG. 12.

FIG. 12 illustrates a system level diagram 1200, which is very similar to the system level diagram 1000 in FIG. 10 and the system level diagram 800 in FIG. 8, the major difference being the use of predetermined phrases (e.g., instructions sets, progress information, prerecorded information, announcements) sent from a standard telephone via text server 1220 to external TDD device 1205. These changes are necessary to implement the process shown in FIG. 13. FIG. 13 is flow diagram that illustrates a preferred process used to convert DTMF to text in order to establish real time communication via a text server from either the desktop or TDD device and a display telephone.

System level diagram 1200 illustrates a system that is capable of delivering text messages as audio messages to a voice mail box in Meridian Mailv system 1230 via a text-to-voice converter. Note that this can also be used for real time communication, such that a TDD user can send text to a cellular or wireless telephone that does not have access to a TTY device. In particular, as shown in the flow chart illustrated in FIG. 13, a caller types a message on telephone 1216B or an external TDD device, such as external TDD device 1205 in communication with private branch exchange 1215, which is converted to voice, so that a hearing person can hear the message over a telephone, such as telephone 1216A (e.g., a normal telephone or a cellular or wireless telephone). In some instances, the message can be displayed on the phone instrument itself. The second party uses the touch pad to answer the messages or questions with pre-defined commands, a table of which is accessible by text server 1220. For instance, the number "1" can mean "Yes"; the number "2" can mean "No"; the number "3" can mean "today"; the number "4" can mean "tomorrow"; the index "*" can mean "PM"; the index "190 " can mean "AM"; and in the case of actual times, the second party can enter the number "*1" to indicate 1 P.M. Other keys may have specific text words or phrases associated with them. Preferably, the Companion™, ADSI, telecator, or other display telephone protocol software (e.g., Telocator Alpha Numeric Protocol ("TAP")) is used to send the text to the display phone display (e.g., a TDD device or personal computer). This will allow a telephone user (e.g., cellular, wireless, or wired), who is using a "standard" DTMF phone, to receive a TDD message in the phone display and respond to the message received by pressing the keys on the telephone and thereby sending a programmable return text message.

The following messages illustrate a sample exchange between the TDD user and a telephone having a display which is shown in the telephone display:

TDD USER SENDS MESSAGE: "I got the groceries."
THIS MESSAGE IS SHOWN IN THE TELEPHONE DISPLAY
PHONE USER PRESSES THE NUMBER 2, WHICH HAS BEEN PROGRAMMED TO SEND THE MESSAGE "YES" TO THE TDD USER'S TDD:
TDD USER SENDS MESSAGE: "Can you get the dry cleaning?"
PHONE USER PRESSES THE NUMBER 1, WHICH HAS BEEN PROGRAMMED TO SEND THE MESSAGE "NO" TO THE TDD USER'S TDD.

As before, system level diagram 1200 answers and directs a TDD call generated from an external TDD device, such as external TDD device 1205 that travels through communication link 1240A to a telephone network, such as telephone network 1210. And, a TDD call is directed from telephone network 1210 through communication link 1240B to a port on PBX system 1215. PBX system 1215 is linked via communication link 1240C to internal modem(s) 1222 on text server 1220. Then, a TDD call is directed through communication link 1240D through Meridian Mail ACCESS™ coordinates MWI to Meridian Mail™ system 1230, which is, in turn, linked to PBX system 1215 through communication link 1240E. PBX system 1215 is, in turn, in communication with telephone 1216A through communication paths 1240F and to telephone 1216A through second telephone network 1210A and communication path 1270A. The called party can be notified with a prerecorded message, text to voice conversion of the CLID, ANI, PBX and/or computer database information (time, trunk group, internal network group, etc.).

As mentioned above, FIG. 15A is flow diagram that illustrates a preferred process used to enable a user to automatically build a mail box for an individual able or desiring to take a TDD call. FIG. 15B is flow diagram that illustrates a preferred process used to retrieve a message, which is preferably implemented by system level diagram 1400 shown in FIG. 14.

Figure 14:
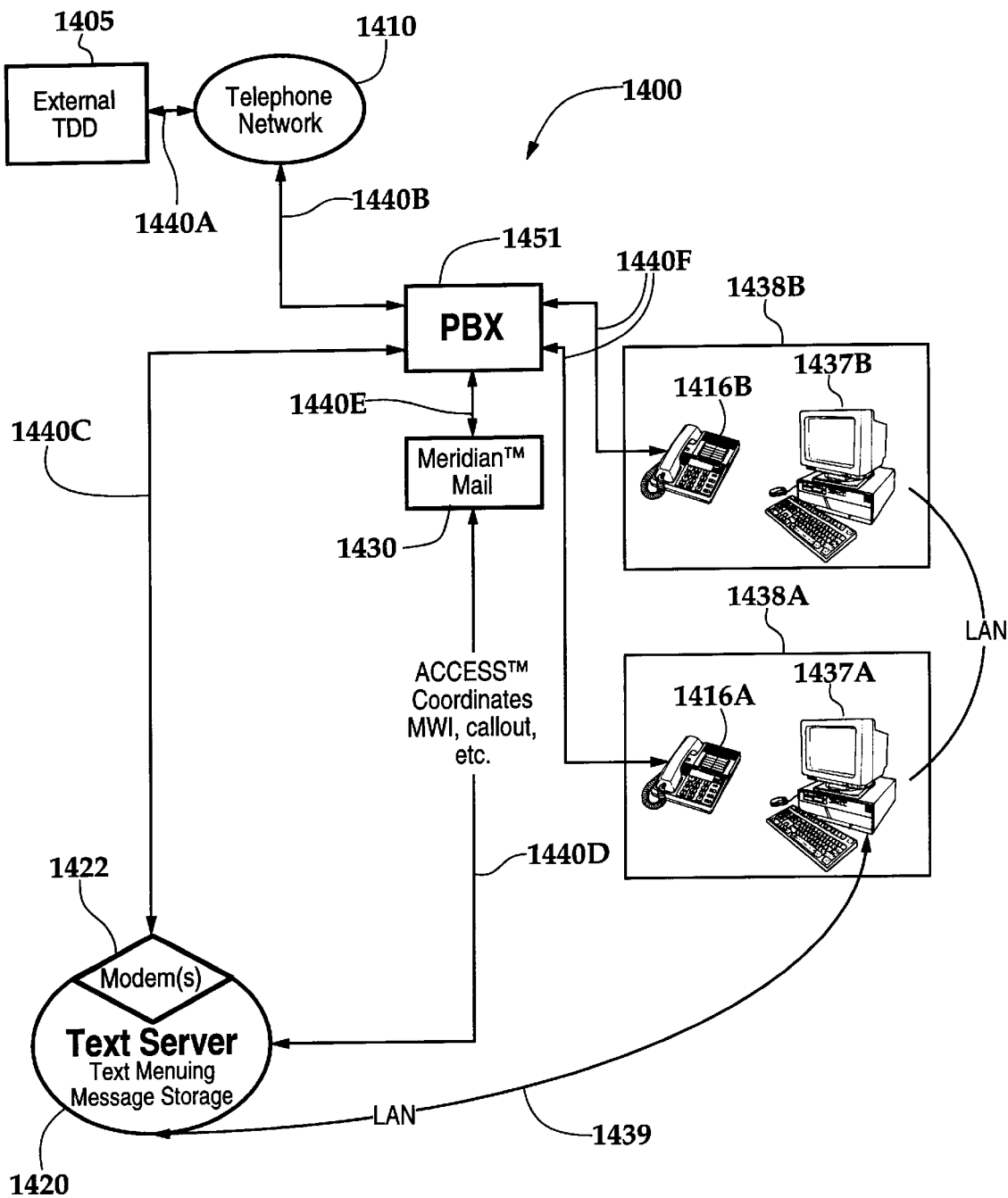
FIG. 14 is a system level diagram 1400 having at least one external TDD device 1405, telephone network 1410, PBX system 1415, text server 1420 (with internal modem 1422), Meridian Mail™ system 1430 (with Meridian Mail ACCESS™ coordinates), at least one combination 1438A (having terminal device 1437A and telephone 1416 A), and communication paths 1440A, 1440B, 1440C, 1440D, 1440E, and 1440F.
Figure 15A:
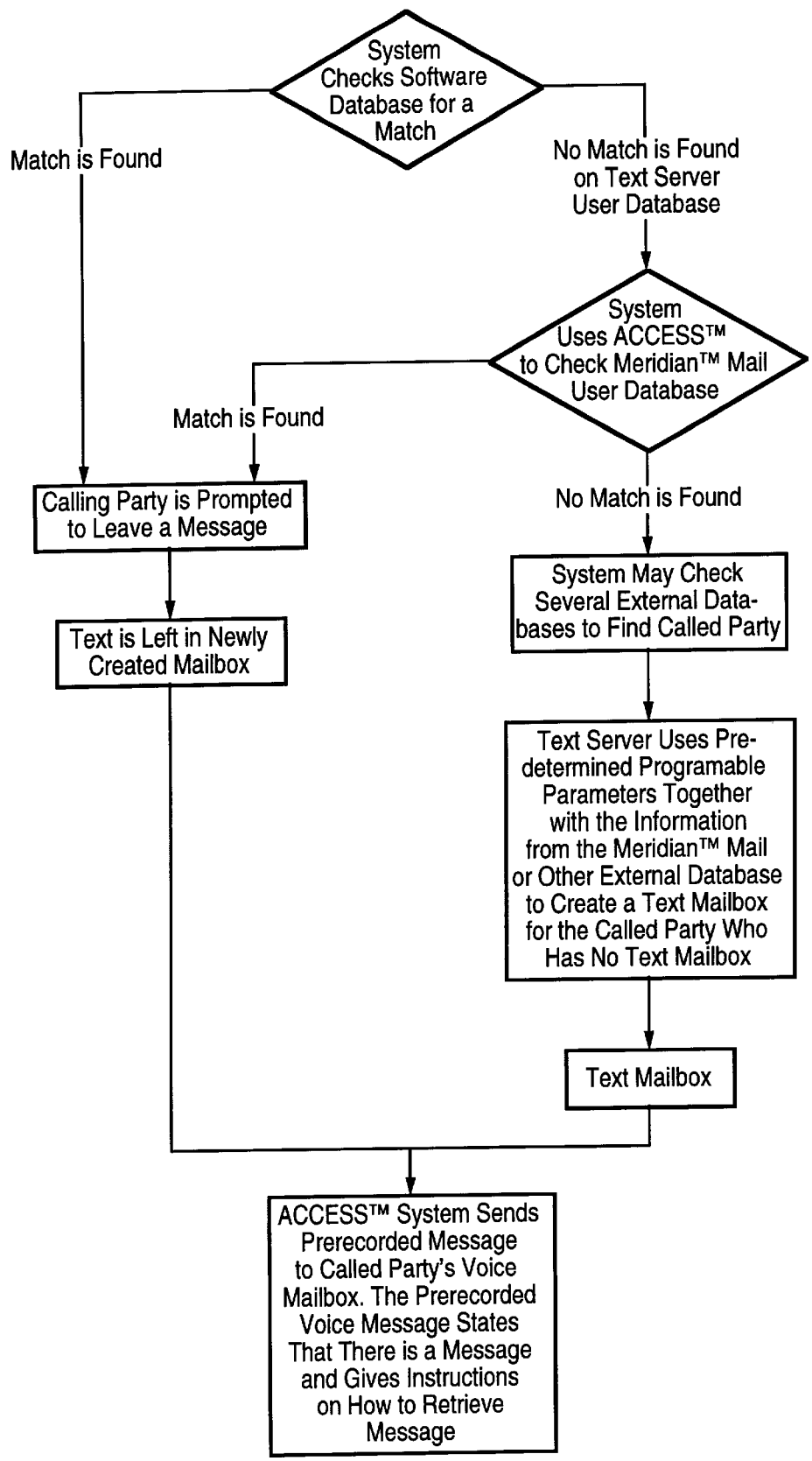
FIG. 15A is flow diagram that illustrates a preferred process used to enable a user to automatically build a mail box for an individual able or desiring to take a TDD call, which is preferably implemented by system level diagram 1400 shown in FIG. 14.
Figure 15B:
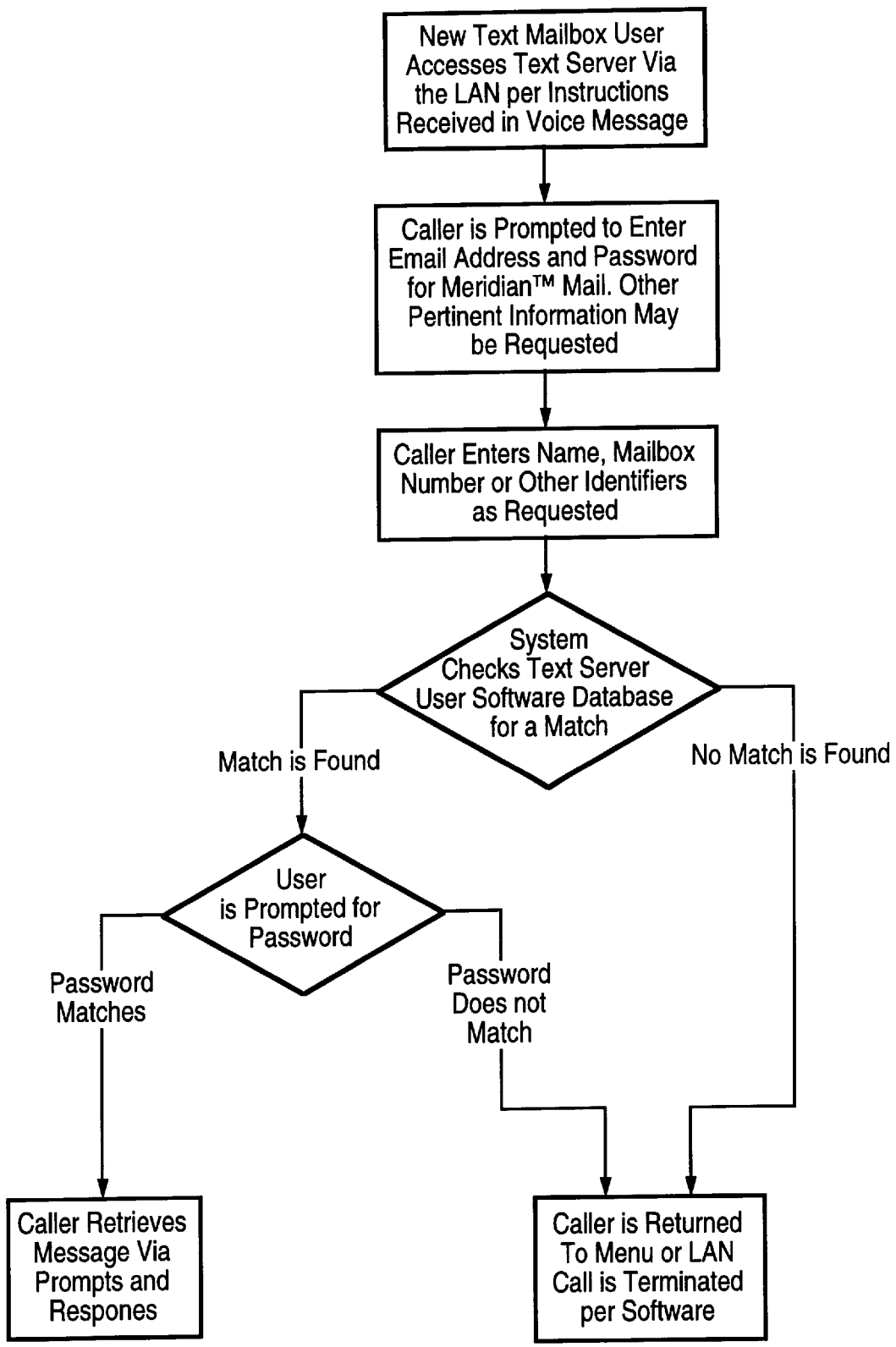
FIG. 15B is flow diagram that illustrates a preferred process used to retrieve a message, which is preferably implemented by system level diagram 1400 shown in FIG. 14.

Preferred embodiments of the process shown in FIG. 15A are preferably implemented by system level diagram 1400 shown in FIG. 14. System level diagram 1400 answers and directs a TDD call generated from an external TDD device, such as external TDD device 1405 that travels through communication link 1240A to a telephone network, such as telephone network 1410. And, a TDD call is directed from telephone network 1410 through communication link 1440B to a port on PBX system 1415. PBX system 1415 is linked via communication link 1440C to internal modem 1422 on text server 1420. Then, a TDD call is directed through communication link 1440D through Meridian Mail ACCESS™ coordinates MWI to Meridian Mail™ system 1430, which is, in turn, linked to PBX system 1415 through communication link 1440E. PBX system 1415 is, in turn, in communication with at least one telephones 1416A and 1416B through communication paths 1040F. Text server 1420 is in communication with terminal devices 1437A and 1437B (e.g., personal computers) via network connection 1435. Telephone 1416A and terminal device 1437A are preferably grouped together on a single desktop, so that a receiving party at that location 1438A has access to both telephone 1416A and terminal device 1437A simultaneously; telephone 1416B and terminal device 1437B are preferably grouped together on a single desktop, so that a receiving party at that location 1438B has access to both telephone 1416B and terminal device 1437B. Note that the TDD call from the caller is routed through text server 1420 and network connection (e.g., Internet) 1435 to terminal devices 1437A and 1437B, but PBX system 1415, Meridian Mail™ system 1430, and communication paths 1440D, 1440E, and 1440F also work together to inform the receiving party to inform them that the TDD call is waiting. Thus, the system level configuration 1400 utilizes both the terminal devices 1438A and 1437B and telephones 1416A and 1416B to communicate with the person initiating the TDD call. The called party can be notified with a prerecorded message, text to voice conversion of the CLID, ANI, PBX and/or computer databases information that they have a caller waiting via voice or phone display. The prerecorded message preferably also tells the called party how to handle the call.

As stated in FIGS. 15A and 15B, system level configuration 1400 uses one or more external databases, such as the database used by Meridian Mail™ system 1430 as a reference for allowable or permitted 'user' 'membership' in overal system level configuration 1400. Note the data is used to create a text mailbox (full or partial) for the called party. As a result, administators of system level configuration 1400 do not have to individually add each user of the TTY/TDD features or a list of potential users of the TTY/TTD features to be stored in memory accessible by text server 1420 along with the hordes of other lists of users of other features, such as voice, e-mail, or network users. The list of users of the TTY/TDD features is created on an 'as needed' basis. Consequently, the features can be installed on existing systems with minimal efrort by a system administrator. Specifically, as shown in FIG. 15A, when a person receives a message and they do not have a text mailbox, a message will be sent to the users' e-mail box or voice mail box, which preferably includes a standard message informing them that they have received a text message (from a TTY/TDD device, such as external TDD 1405), along with the corresponding message header, retrieval instructions and an access code number. The person receiving the text message will then be prompted to retrieve the message either via a TTY or via a LAN connection to the server. The person receiving the text message then preferably accesses the system and identifies himself via the access code. In addition, if a text mail box did not currently exist when the first party called such that the server software has incomplete mailbox information, the person receiving the text message will be asked for necessary information to create the text mailbox or to complete information if a partial mailbox is present on external data and a text mail box will be automatically created for them permanently if he desires. The text message will then be delivered in the media choosen. Text server 1420 will keep the recently created text mail box in the system. The system administrator will control the class of service, the time that a mail box is kept in the system and so on per a preprogrammed set of instructions in the system.

One advantage of preferred embodiments is that they are easily adapted to be used in automatic call distribution ("ACD") call centers. Once again, system level diagram 1600 answers and directs a TDD call generated from an external TDD device, such as external TDD device 1605 that travels through communication link 1240A to a telephone network, such as telephone network 1610. And, a TDD call is directed from telephone network 1610 through communication link 1640B to a port on PBX system 1615. PBX system 1615 is linked via communication link 1640C to internal modem(s) 1622 on text server 1620. Then, a TDD call is directed through communication link 1240D through Meridian Mail ACCESS™ coordinates MWI to Meridian Mail™ system 1630, which is, in turn, linked to PBX system 1615 through communication link 1640E. PBX system 1615 is, in turn, in communication with at least one telephones 1616A and 1616B through communication paths 1040F. Text server 1620 is in communication with terminal devices 1637A and 1637B (e.g., personal computers) via network connection 1635. Telephone 1616A and terminal device 1637A are preferably grouped together on a single desktop, so that a receiving party at that location 1638A has access to both telephone 1616A and terminal device 1637A simultaneously; telephone 1616B and terminal device 1637B are preferably grouped together on a single desktop, so that a receiving party at that location 1638B has access to both telephone 1616B and terminal device 1637B. Note that the TDD call from the caller is routed through text server 1620 and network connection (e.g., Internet) 1635 to terminal devices 1637A and 1637B, but PBX system 1615, Meridian Mail™ system 1630, and communication paths 1640D, 1640E, and 1640F also work together to inform the receiving party to inform them that the TDD call is waiting. Thus, the system level configuration 1600 utilizes both the terminal devices 1638A and 1637B and telephones 1616A and 1616B to communicate with the person initiating the TDD call.

Figure 16:
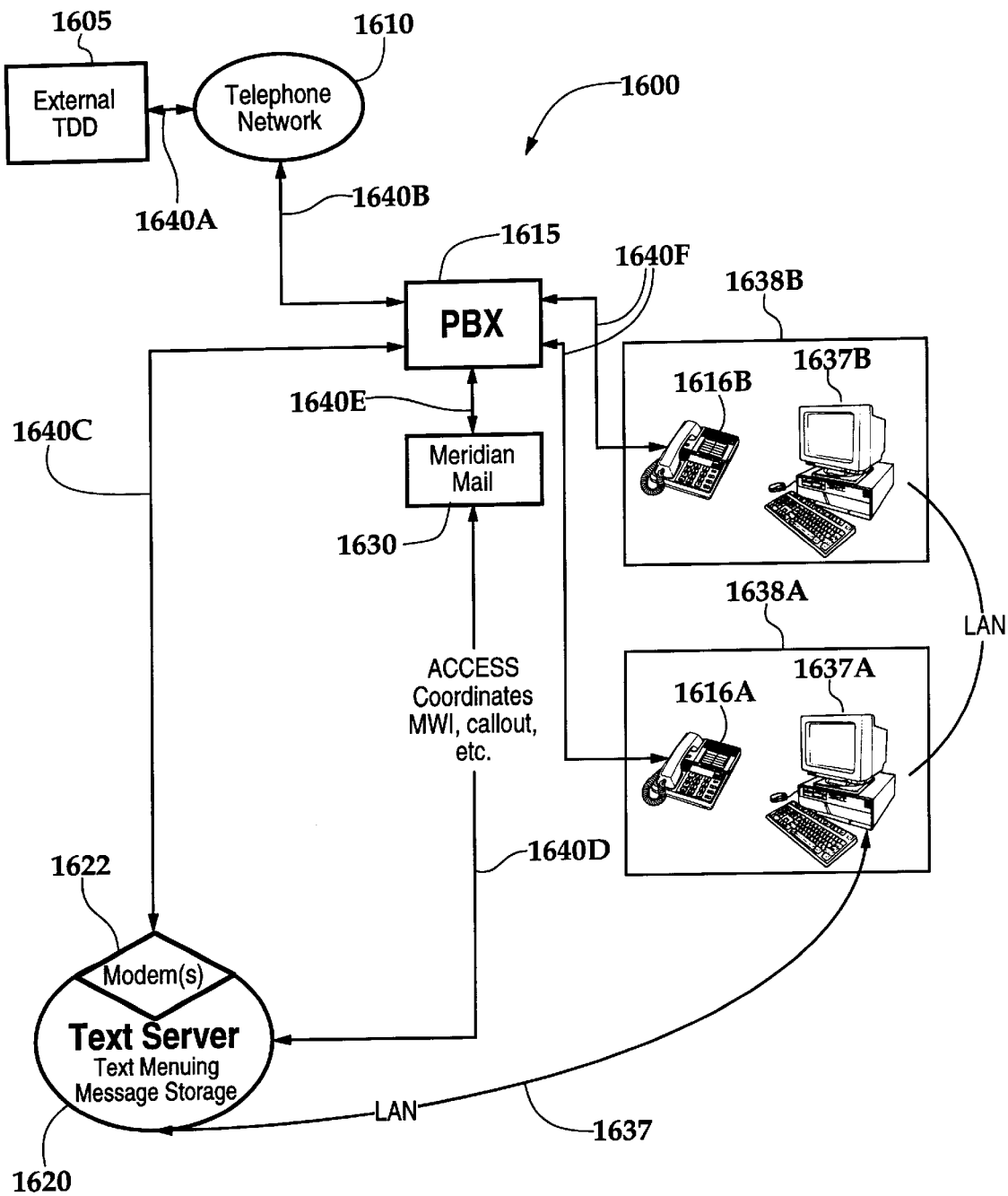
FIG. 16 is a system level diagram 1600 having at least one external TDD device 1605, telephone network 1610, PBX system 1615, text server 1620 (with internal modem(s) 1622), Meridian Mail™ system 1630 (with Meridian Mail ACCESS™ coordinates), at least one combination 1638A (having terminal device 1637A and telephone 1616A), and communication paths 1640A, 1640B, 1640C, 1640D, 1640E, and 1640F.

As shown in FIG. 16, preferred embodiments integrate TTY with ACD call centers by placing a call to the ACD queue, while the TDD call is 'on-hold.' When an agent is available, the system level configuration 1600 will inform the agent via the telephone with a prerecorded message that the call has been initiated with a TDD device, such as external TDD device 1605 and, simultaneously, connect the caller to the terminal device 1638A (to which the agent has access, such as a desktop personal computer) via LAN 1637. Information about the TDD user can be stored in a memory accessible by text server 1620. Also, since ACD call centers are dependent upon a telephone call to keep traffic studies straight, preferred embodiments maintain a voice connection to the agent's telephone, such as telephone 1616A, throughout the call, so that the cal record is accurate and allows the TDD user, who happen to be speech impaired, to hear the telephone call (as well as read the response) and, then, respond with appropriate text messages.

Finally, preferred embodiments also use a special display that presents 'letters' mode and 'figures' mode, both of which are initiated by TTD/TTY systems. In particular, when a TTY connection is made to the desktop computer, there is a possibility that the received text may be in the incorrect mode due to transmission or user errors. Thus, preferred embodiments use the display that allows a "corrected" representation of the original mode to be displayed simultaneously. This "corrected" representation is preferably highlighted in some fashion, such as in a contrasting color, subdued hue or other distinguishing print, such as Italics, etc. It may look like the following example:

```
THIS IS BILL. TO RETURN THIS CALL DIAL Q WPW TTT QWQWM
5=8S 8S ?8]]M 59 43574, 5=8S :-]] $8-] 1 205 555 1212.
```

In this example, the original text "THIS IS BILL. TO RETURN THIS CALL DIAL" became unreadable after the word "dial." The alternate line represents the same text "shifted" into the other mode, "5=8S 8S?8]]M 59 43574, 5=8S :-]]$8-]" is unintelligible until "1 205 555 1212." The person receiving the text need only pay attention to the alternate line, which is preferably highlighted in some fashion, to translate the telephone number. This alternate representation may be configured by the user to appear in one of many screen locations, such as below the original line, in status bar or other floating window. In the following example, the underline text shows what the user would read in this instance:

```
THISISBILL.TORETURNTHISCALLDIAL Q WPW TTT QWQWM
5=8S 8S ?8]]M 59 43574, 5=8S :-]] $8-] 12055551212.
```

Figure 18:
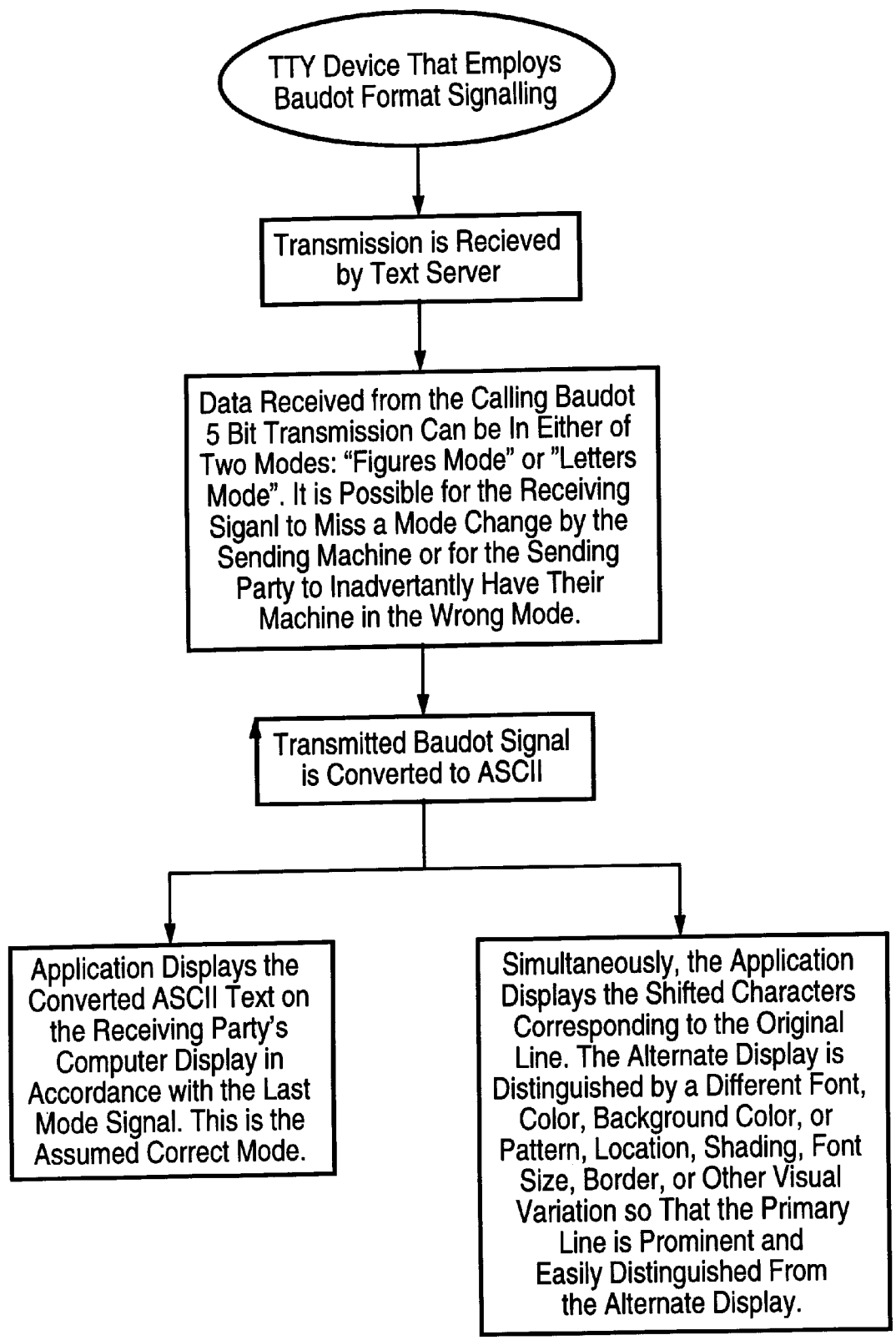
FIG. 18 is a flow diagram that illustrates how a preferred display for a TDD device is created.

FIG. 18 is a flow diagram that illustrates how the preferred display for a TDD device shown above is created. Specifically, the transmission from the TTY deice that employs Baudot format signaling is received by a text server. As discussed above, data received from the calling Baudot five (5) bit transmission can be in either of two modes "figures mode" or "letters mode." As a result, it is possible for the receiving signal to miss a mode change sent by the sending machine (e.g., TDD device) or for the calling or sending party to inadvertently have the sending machine in the wrong mode. Consequently, once the signal is received, it is converted into ASCII. The text server then displays the converted ASCII text on the receiving part's computer display in accordance with the last mode signal. This is the assumed correct mode. Simultaneously, the text server displays the characters corresponding to the other mode below the assumed primary mode. The second line or "other mode" is distinguished by a different font, color, or other visual variation, so that the first line is prominent and easily distinguished from the second line, but the second line is still easily read.

Preferred embodiments have a number of advantages. In particular, preferred embodiments integrate TDD and TTY calls into mainstream telephone systems, voice processing and computer communication systems (e.g., a text server, a networked personal computer). Preferred embodiments may exist on a standard text server computer that is separate from the telephone system and voice processing system and/or it may be integral with the telephone system and/or voice processing system. Preferred embodiments combine modem based TDD/TTY translation (TDD or TTY to ASCII and ASCII to TDD or TTY), Bulletin Board, E-Mail, chat, voice processing system and LAN systems to allow callers using TDD or TTY to initiate a TDD call to communicate with traditional users of a telephone system via text messages stored on the text server for the overall system. Callers initiating TDD calls are able to selectively route the TDD calls that they initiate by responding to automated TDD/TTY prompts stored in memory of the text server and accessed with software run by the text server. The storage media for both the prompts and the messages are is ASCII or similar text formats. All announcements are in SCII or similar format.

In addition, both TDD and TTY signals are acceptable to preferred embodiments, since speech impaired persons may not use TDD in favor of a more ubiquitous TTY device which may use a standard keyboard or other specialized interface. Thus, preferred embodiments can communicate with both either a user of a TDD and/or a user of a TTY (ASCII) device, which heightens the flexibility of the overall system.

Also, preferred embodiments use standard telephone features to indicate via telephone instrument display, distinctive ring or other means that the call is from the TDD/TTY system. The receiving party will be able to use their terminal device to initiate standard telephone features that include but are not limited to call transfer, call hold, park and so on. Persons who are connected to the system via terminal device will be able to use the system to initiate calls to TDD/TTY devices, to computer services that provide text services such as text pagers, text telephone displays, etc. The caller will be able to call into the system and by inputting data specify and receive files that are stored on the server. The system will use any data received as call status information, call source information or call destination information in the form of calling party identification, calling line identification or other similar telephone system initiated services to route, treat or greet the caller. Incoming calls may be given different treatment according to the time of day, date, day of week, etc. The source of the call may also be a terminal via the LAN, WAN, or Internet, so that a person with a terminal capable of generating ASCII or similar standard text may connect to and take advantage of system features without necessarily using a TDD.

Further Modifications and Variations

Although the invention has been described with reference to a specific embodiment, this description is not meant to be construed in a limiting sense. There may be other applications than just those for the deaf, speech impaired, or hard-of-hearing, such as calls over an Internet. The example embodiments shown and described above are only intended as an example. Various modifications of the disclosed embodiment as well as alternate embodiments of the invention will become apparent to persons skilled in the art upon reference to the description of the invention. Also, a variety of communication paths can be used to link together various elements of preferred embodiments, such as electrical connections, optical connections, wireless connections, etc.

Thus, even though numerous characteristics and advantages of the present inventions have been set forth in the foregoing description, together with details of the structure and function of the inventions, the disclosure is illustrative only, and changes may be made in the detail, especially in matters of shape, size and arrangement of the parts within the principles of the inventions to the full extent indicated by the broad general meaning of the terms used in the attached claims. Accordingly, it should be understood that the modifications and variations suggested above and below are not intended to be exhaustive. These examples help show the scope of the inventive concepts, which are covered in the appended claims. The appended claims are intended to cover these modifications and alternate embodiments.

In short, the description and drawings of the specific examples above are not intended to point out what an infringement of this patent would be, but are to provide at least one explanation of how to make and use the inventions contained herein. The limits of the inventions and the bounds of the patent protection are measured by and defined in the following claims.

I claim:

1. An integrated text based TTY system, comprising:
  (a) a telephone network adapted to receive a TTY call and identification information from a calling party using a TTY device to a called party;
  (b) a private branch exchange in communication with said telephone network and adapted to receive said TTY call from said telephone network;
  (c) a voice mail system in communication with said private branch exchange; and
  (d) a text server in communication with said private branch exchange to receive said TTY call, said text server in communication with said voice mail system, said text server receives identification information to identify said called party, so that said text server can check a first database of individuals able to receive said TTY call to determine whether said called party is in said first database and if said called party is in said first database then said text server signals said called party that said TTY call from said calling party has been made, wherein said private branch exchange is in communication with said text server via a modem and a first communication path extending from said private branch exchange to said modem, said modem in communication with said text server to receive said TTY call routed to said text server by said private branch exchange, said modem recognizes said TTY call as conforming to TTY standards and, if necessary, converts said TTY call into ASCII, said modem also receives a response to said TTY call, converts said response to said TTY call into an appropriate format that conforms to said TTY standards to create a converted response to said TTY call, and transmits said converted response to said TTY call and further wherein if said text server determines that said called party is in said first database, then said text server presents said calling party with a greeting from a mailbox holder in communication with said text server, then said text server prompts said calling party to leave a message, and once said message is left by said calling party, said text server stores said message in memory accessible by said text server.

2. The integrated text based TTY system of claim 1, wherein said TTY device is external to said integrated text based TTY system.

3. The integrated text based TTY system of claim 1, wherein said telephone network is a standard telephone network.

4. The integrated text based TTY system of claim 1, wherein said text server is in communication with said private branch exchange via said voice mail system and said text server is in direct communication with said voice mail system and said voice mail system is in direct communication with said private branch exchange, and further wherein said text server alerts said called party that said TTY call has been made by leaving a second message in said voice mail system.

5. The integrated text based TTY system of claim 1, wherein said identification information is selected from a group consisting of said called party's first name, said called party's employee number, said called party's social security number, said called party's computer address, said called party's mailbox number, said called party's log in name, said called party's last name, said called party's full name, and said called party's individual telephone number.

6. The integrated text based TTY system of claim 1, wherein said voice mail system has a voice mail database of all parties having access to said voice mail system and if said called party is not in said first database, then said text server instructs said voice mail system to check said voice mail database to determine whether said called party is in said voice mail database and if said called party is in said voice mail database, said text server signals said called party that said TTY call has been made.

7. The integrated text based TTY system of claim 1, wherein said voice mail system has a voice mail database of all parties having access to said voice mail system and if said called party is not in said first database, then said text server instructs said voice mail system to check said voice mail database to determine whether said called party is in said voice mail database and further wherein if said called party is in said voice mail database, then said text server presents said calling party with greeting from a mailbox holder; prompts said calling party to leave a second message, stores said second message left by said calling party in memory accessible by said text server.

8. The integrated text based TTY system of claim 1, wherein if said called party is not in said first database, then said text server instructs said calling party to leave a second message for said called party which will be stored in memory accessible by said text server, then once said calling party leaves said second message, said text server stores said second message in memory accessible by said text server.

9. The integrated text based TTY system of claim 1, wherein said first database is stored in memory accessible by said text server.

10. The integrated text based TTY system of claim 1, wherein said greeting is in a format that is understandable to an individual, said individual selected from a group consisting of a deaf person, speech impaired person, and hard-of-hearing person.

11. The integrated text based TTY system of claim 1, wherein said greeting is in text.

12. The integrated text based TTY system of claim 1, wherein said message also contains instructions to said called party to inform said called party how to retrieve said message.

13. The integrates text based TTY system of claim 1, wherein said text server notifies said called party that said message has been received by lighting a light on a telephone device used by said called party to indicate that said message has been received, said telephone in communication with said voice mail system and said private branch exchange.

14. The integrated text based TTY system of claim 1, further said TTY call has a source format, and wherein said text server has a modem, said modem in communication with said text server and said private branch exchange, said modem determines said source format of said TTY call and matching all response to said format.

15. The integrated text based TTY system of claim 1, wherein said database is comprised of a list of individuals having access to said text server.

16. The integrated text based TTY system of claim 1, wherein said text server also instructs said called party how to receive said TTY call.

17. An integrated text based TTY system, comprising:
(a) a telephone network adapted to receive a TTY call from a calling party using a TTY device to a called party, said TTY call being modem translatable, said TTY call having information disclosing a format of said TTY device being used to initiate said TTY call and identification information identifying said called party;
(b) a private branch exchange in communication with said telephone network and adapted to receive said TTY call from said telephone network;
(c) a voice mail system in communication with said private branch exchange; and
(d) a text server in communication with said private branch exchange via a modem to receive said TTY call, said modem able to receive and identify said TTY call as conforming to TTY standards and able to convert said TTY call to ASCII, said modem also able to receive a response to said TTY call, said modem converts said response to said TTY call to conform to said TTY standards, and said modem transmits said response to said TTY call once converted, said text server also in communication with said voice mail system, said text server receives said identification information to identify said called party, said text server checks a first database of individuals able to receive said TTY call to determine whether said called party is in said first database, and if said called party is in said first database, then said text server leaves a first message in said voice mail system which alerts said called party that said TTY call has been made and further wherein said text server determines whether said called party is in said first database, and if said text server determines that said called party is in said first database, then said text server presents said calling party with a greeting from a mailbox holder in communication with said text server, said text server prompts said calling party to leave a second message, stores said second message in memory accessible by said text server.

18. The integrated text based TTY system of claim 17, wherein said TTY device is external to said integrated text based TTY system and said telephone network is a standard telephone network.

19. The integrated text based TTY system of claim 17, wherein said identification information is selected from a group consisting of said called party's first name, said called party's employee number, said called party's social security number, said called party's computer address, said called party's mailbox number, said called party's log in name, said called party's last name, said called party's full name, and said called party's individual telephone number.

20. The integrated text based TTY system of claim 17, wherein said voice mail system has a voice mail database of all parties having access to said voice mail system and if said called party is not in said first database, then said text server instructs said voice mail system to check said voice mail database to determine whether said called party is in said voice mail database and if said called party is in said voice mail database, then said text server leaves said first message in said voice mail system.

21. The integrated text based TTY system of claim 20, further wherein if said called party is in said voice mail database, then said text server presents said calling party with a greeting, said text server prompts said calling party to leave a third message and once said third message is provided, said text server stores said third message in memory accessible by said text server, and said text server leaves said first message in said voice mail system for said called party.

22. The integrated text based TTY system of claim 20, wherein if said called party is not in said voice mail database, then said TTY call is routed to a general mailbox in said voice mail system.

23. The integrated text based TTY system of claim 21, wherein said greeting is in a format that is understandable to an individual, said individual selected from a deaf person, speech impaired person, and hard-of-hearing person.

24. The integrated text based TTY system of claim 20, wherein said first message also contains instructions to inform said called party how to retrieve said second message.

25. The integrates text based TTY system of claim 20, wherein said text server notifies said called party that said first message has been received by lighting a light on a telephone used by said called party, said telephone in communication with said voice mail system and said private branch exchange.

* * * * *